United States Patent
Akashi et al.

(10) Patent No.: US 8,707,784 B2
(45) Date of Patent: Apr. 29, 2014

(54) LAMINATED STRUCTURE PROVIDED WITH MOVABLE PORTION

(75) Inventors: Teruhisa Akashi, Nagoya (JP); Yutaka Nonomura, Nagoya (JP); Motohiro Fujiyoshi, Seto (JP); Hirofumi Funabashi, Nagoya (JP); Yoshiyuki Hata, Aichi (JP); Yoshiteru Omura, Seto (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 407 days.

(21) Appl. No.: 13/047,274

(22) Filed: Mar. 14, 2011

(65) Prior Publication Data

US 2011/0232384 A1    Sep. 29, 2011

(30) Foreign Application Priority Data

Mar. 25, 2010    (JP) ................................. 2010-070077

(51) Int. Cl.
*G01C 19/56* (2012.01)

(52) U.S. Cl.
USPC ..................................................... 73/504.12

(58) Field of Classification Search
USPC ..................................................... 73/504.12
See application file for complete search history.

(56) References Cited

U.S. PATENT DOCUMENTS

| | | | |
|---|---|---|---|
| 5,565,625 A | 10/1996 | Howe et al. | |
| 5,756,901 A | 5/1998 | Kurle et al. | |
| 5,780,740 A | 7/1998 | Lee et al. | |
| 5,983,721 A | 11/1999 | Sulzberger et al. | |
| 6,122,961 A | 9/2000 | Geen et al. | |
| 6,125,701 A | 10/2000 | Sugitani et al. | |
| 6,149,190 A | 11/2000 | Galvin et al. | |
| 6,450,033 B1 | 9/2002 | Ito et al. | |
| 6,481,284 B2 | 11/2002 | Geen et al. | |
| 6,487,908 B2 | 12/2002 | Geen et al. | |
| 6,508,124 B1 | 1/2003 | Zerbini et al. | |
| 6,546,801 B2 | 4/2003 | Orsier et al. | |

(Continued)

FOREIGN PATENT DOCUMENTS

| | | |
|---|---|---|
| JP | A-2001-91265 | 4/2001 |
| JP | A-2003-194545 | 7/2003 |

(Continued)

OTHER PUBLICATIONS

U.S. Appl. No. 12/723,971, filed Mar. 15, 2010 in the name of Teruhisa Akashi et al.

(Continued)

*Primary Examiner* — Hezron E Williams
*Assistant Examiner* — Gregory J Redmann
(74) *Attorney, Agent, or Firm* — Oliff PLC

(57) ABSTRACT

A structure having a first movable portion displaced perpendicular to a substrate surface and a second movable portion displaced parallel to the substrate surface is realized by a laminated structure employing a nested structure for the first portion and the second portion. The laminated structure is provided with inner and outer movable portions. A y spring is connected to the outer portion, and the outer portion is supported in a y-axis direction by the y spring at a height apart from an outer substrate. A z spring is connected to the inner portion, and the inner portion is supported in a z-axis direction by the z spring at a height apart from the outer substrate. The outer portion and the z spring are at different heights from the substrate, and the z spring overpasses across the outer portion at a height apart from the outer movable portion.

4 Claims, 12 Drawing Sheets

(56) References Cited

U.S. PATENT DOCUMENTS

| | | |
|---|---|---|
| 6,755,289 B2 | 6/2004 | Weiss |
| 6,786,313 B2 | 9/2004 | Weiss et al. |
| 6,925,877 B2 | 8/2005 | Geen et al. |
| 6,964,195 B2 | 11/2005 | Hobbs et al. |
| 7,322,242 B2 | 1/2008 | Merassi et al. |
| 7,406,866 B2 | 8/2008 | Geen et al. |
| 7,501,835 B2 | 3/2009 | Fujiyoshi et al. |
| 7,637,155 B2 | 12/2009 | Delevoye |
| 7,723,901 B2 | 5/2010 | Inaguma et al. |
| 7,849,742 B2 | 12/2010 | Wang et al. |
| 8,183,650 B2 | 5/2012 | Wang et al. |
| 8,186,220 B2 | 5/2012 | Geisberger et al. |
| 2003/0056589 A1 | 3/2003 | Geen et al. |
| 2003/0110858 A1 | 6/2003 | Kim et al. |
| 2003/0146064 A1 | 8/2003 | Weiss et al. |
| 2003/0183007 A1 | 10/2003 | Willig et al. |
| 2005/0166675 A1 | 8/2005 | Hobbs et al. |
| 2005/0274182 A1 | 12/2005 | Geen et al. |
| 2009/0090184 A1 | 4/2009 | Wang et al. |

FOREIGN PATENT DOCUMENTS

| | | |
|---|---|---|
| JP | A-2007-333467 | 12/2007 |
| WO | WO 99/12002 A2 | 3/1999 |
| WO | WO 02/066927 A1 | 8/2002 |

OTHER PUBLICATIONS

Oct. 11, 2012 Office Action issued in U.S. Appl. No. 12/723,971.

LAMINATED STRUCTURE PROVIDED WITH MOVABLE PORTION

CROSS-REFERENCE TO RELATED APPLICATION

This application claims priority to Japanese Patent Application No. 2010-070077 filed on Mar. 25, 2010, the contents of which are hereby incorporated by reference into the present application.

TECHNICAL FIELD

The present application relates to a laminated structure provided with movable portions. More particularly, the present application relates to a laminated structure provided with a first movable portion that is able to move in a direction perpendicular to a substrate surface and a second movable portion that is able to move in a direction parallel to a substrate surface. The laminated structure as referred to here indicates a laminated structure in which each constituent portion extends parallel to a substrate surface and constituent portions are integrated over a range in which they make contact in a vertical direction. Such a laminated structure is manufactured by executing etching in a prescribed pattern for each layer of a laminated substrate in the form of a silicon-on-insulator (SOI) substrate.

DESCRIPTION OF RELATED ART

A method is known that utilizes a phenomenon in which Coriolis force is generated in a third axial direction when a moving body oscillating in a first axial direction rotates about a second axis to measure angular velocity about the second axis from a displacement in the third axial direction for use as a method employed by an angular velocity sensor. Here, the first to third axes are three mutually orthogonal axes. When attempting to realize a sensor detecting angular velocities about two axes (to be referred to as a biaxial angular velocity sensor) employing this method, a first movable portion that is able to move in a direction perpendicular to a substrate surface and a second movable portion that is able to move in a direction parallel to the substrate surface are at least required.

In the case of realizing a sensor that detects acceleration along a first axis, acceleration along a second axis and acceleration along a third axis (to be referred to as a triaxial acceleration sensor) as well, a first movable portion that is able to move in a direction perpendicular to a substrate surface and a second movable portion that is able to move in a direction parallel to the substrate surface are at least required.

There is also a desire to realize a structure that supports a first movable portion displaceably in a direction perpendicular to a substrate surface and a structure that supports a second movable portion displaceably in a direction parallel to the substrate surface with a laminated structure. Accompanying the development of semiconductor manufacturing technology, various types of processing technologies have come to be used practically for laminated substrates, and if it were possible to realize a structure that has both a first movable portion and a second movable portion with a laminated structure, it would be possible to reduce sensor size and the like. In addition, it would also be possible to simultaneously manufacture a plurality of structures from a single substrate.

PCT International Publication No. WO02/066927 discloses a technology that realizes a structure provided with a plurality of movable portions with a laminated structure. This laminated structure is provided with a substrate, an outer bearing base, a drive element, a Coriolis element, a detection element and an inner bearing base. The drive element, the Coriolis element and the detection element are each in the shape of rectangular frames, and extend parallel to the substrate surface. The Coriolis element is housed inside the drive element, the detection element is housed within the Coriolis element, and when viewed from overhead, constitute a triplex frame. The outer bearing base is fixed to the substrate at four symmetrical locations about the center of this triplex frame, and protrudes from the substrate surface. A spring that is flexible in an x-axis direction and rigid in y-axis and z-axis directions connects the vicinity of an apex of the outer bearing base and the drive element, a spring that is flexible in the y-axis direction and rigid in the x-axis and z-axis directions connects the drive element and the Coriolis element, a spring that is flexible in the x-axis direction and rigid in the y-axis and z-axis directions connects the Coriolis element and the detection element, and a spring that is flexible in the y-axis direction and rigid in the x-axis and z-axis directions connects the detection element and the inner bearing base. According to this structure, the drive element is movable in the x-axis direction, the Coriolis element is movable in the x-axis and y-axis directions, and the detection element is movable in the y-axis direction. When an angular velocity about the z-axis is applied, since the Coriolis element that oscillates in the x-axis direction by following the drive element is displaced in the y-axis direction due to Coriolis force, the detection element is displaced in the y-axis direction. The angular velocity about the z-axis can be detected from the amount of y-axis directional displacement of the detection element.

BRIEF SUMMARY OF INVENTION

As described above, it is currently possible to realize a structure provided with two or more movable portions with a laminated structure. However, the prior art is limited to a structure in which all of the two or more movable portions are able to move within a plane parallel to a substrate surface, and is unable to realize a structure provided with a portion that is able to move in a direction perpendicular to the substrate surface with a laminated structure. The related art is unable to realize a biaxial angular velocity sensor or a triaxial acceleration sensor that requires a portion that is able to move in a direction perpendicular to a substrate surface and a portion that is able to move in a direction parallel to the substrate surface.

This would be able to be realized with a laminated structure if all that was required was a portion that is able to move in a direction perpendicular to the substrate surface. Alternatively, this would also be able to be realized with a laminated structure if all that was required was a portion that is able to move in a plane parallel to the substrate surface. However, a biaxial angular velocity sensor or a triaxial acceleration sensor cannot be realized that require both a portion that is able to move in a direction perpendicular to the substrate surface and a portion that is able to move in a plane parallel to the substrate surface.

It should be possible to separately realize a structure provided with a portion that is able to move in a direction perpendicular to a substrate surface and a structure provided with a portion that is able to move in a plane parallel to the substrate surface. If that was enough, the prior art could realize that. However, this would prevent the biaxial angular velocity sensor or the triaxial acceleration sensor as described above from being reduced in size. As a result, the number of movable structures able to be manufactured from a single substrate would end up decreasing, and manufacturing cost per movable structure would end up increasing.

The technology disclosed according to the present specification was created in consideration of the circumstances described above, and an object thereof is to:

(1) realize a structure provided with a first movable portion that is able to move in a direction perpendicular to a substrate surface and a second movable portion that is able to move in a direction parallel to a substrate surface, (2) enable the structure to be reduced in size and be mass-produced as a result of realizing with a laminated structure, and (3) increase the number of structures that can be manufactured from a single substrate and decrease manufacturing cost per structure by employing a nested structure for the first movable portion and the second movable portion.

When three mutually orthogonal axes are defined as an x-axis, a y-axis and a z-axis, and a substrate surface is defined as an x-y plane, a laminated structure of a first aspect disclosed by the present specification is comprising: an outer movable portion provided with two sides extending in the x-axis direction and two sides extending in the y-axis direction; and an inner movable portion housed inside the outer movable portion when viewed from the z-axis direction. A y spring is connected to the outer movable portion, and the outer movable portion is displaceably supported in the y-axis direction by the y spring at a height apart from the substrate. A z spring is connected to the inner movable portion, and the inner movable portion is displaceably supported in the z-axis direction by the z spring at a height apart from the substrate. The outer movable portion and the z spring are formed in different layers at different heights from the substrate, and the z spring overpasses across the outer movable portion at a height apart from the outer movable portion.

In the above description, the y spring refers to an anisotropic spring having a spring constant in the y-axis direction that is smaller than the spring constant in the x-axis direction and the spring constant in the z-axis direction. The spring constant in the y-axis direction of the y spring is preferably in a relationship such that it is one-third or less the spring constant in the x-axis direction and the spring constant in the z-axis direction. Namely, the y spring refers to a spring that is easy to deform in the y-axis direction but is difficult to deform in the x-axis direction and the z-axis direction. Similarly, the z spring refers to an anisotropic spring having a spring constant in the z-axis direction that is smaller than the spring constant in the x-axis direction and the spring constant in the y-axis direction. The spring constant of the z spring in the z-axis direction is preferably in a relationship such that it is one-third or less the spring constant in the x-axis direction and the spring constant in the y-axis direction. Namely, the z spring refers to a spring that is easy to deform in the z-axis direction but is difficult to deform in the x-axis direction and the y-axis direction. An x spring to be subsequently described refers to an anisotropic spring having a spring constant in the x-axis direction that is smaller than the spring constant in the y-axis direction and the spring constant in the z-axis direction. The spring constant of the x spring in the x-axis direction is preferably in a relationship such that it is one-third or less the spring constant in the y-axis direction and the spring constant in the z-axis direction. Namely, the x spring refers to a spring that it is easy to deform in the x-axis direction but is difficult to deform in the y-axis direction and the z-axis direction.

In the structure described above, the outer movable portion and the z spring are formed in a different layers at different heights from the substrate, and the z spring overpasses across the outer movable portion at a height apart from the outer movable portion. According to this structure, the above-mentioned objects can be realized, namely:

(1) realizing a structure provided with a first movable portion that is able to move in a direction perpendicular to a substrate surface (realized through the inner movable portion displaced in the z-axis direction) and a second movable portion that is able to move in a direction parallel to a substrate surface (realized through the outer movable portion displaced in the y-axis direction), (2) enabling the structure to be reduced in size and be mass-produced as a result of realizing with a laminated structure, and (3) increasing the number of structures that can be manufactured from a single substrate and decreasing manufacturing cost per structure by employing a nested structure for the first movable portion (the inner movable portion) and the second movable portion (the outer movable portion) since the inner movable portion is housed within the outer movable portion when viewed from the z-axis direction.

Furthermore, the nested structure as referred to here refers to the first movable portion being housed inside the second movable portion when the substrate is viewed from overhead. The second movable portion and the first movable portion may have similar shapes or different shapes. In addition, the second movable portion and the first movable portion may have a nested structure when viewed from overhead from the z-axis direction, and the second movable portion and the first movable portion may be at different heights in the z-axis direction.

Since the above-mentioned structure is provided with the inner movable portion displaced in the z-axis direction and the outer movable portion displaced in the y-axis direction, a biaxial acceleration sensor can be immediately realized. In addition, various types of devices such as a uniaxial angular velocity sensor, a biaxial angular velocity sensor, a biaxial acceleration sensor, a triaxial acceleration sensor or an actuator that positions within a y-z plane can be realized by using this basic structure in common therewith.

For example, in the case of realizing the biaxial angular velocity sensor or the triaxial angular velocity sensor, a structure may be added to the basic structure that allows displacement in the x-axis direction. In order to accomplish this, an x relaying portion that is positioned outside the outer movable portion when viewed from the z-axis direction may be added. The x relaying portion referred to here refers to a connecting object that connects springs and can be displaced in the x-axis direction. A y relaying portion to be subsequently described refers to a connecting object that can be displaced in the y-axis direction, while a z relaying portion refers to a connecting object that can be displaced in the z-axis direction.

In the case of a structure to which the x relaying portion has been added, a configuration is employed in which both the y spring connected to the outer movable portion and the z spring connected to the inner movable portion are connected to the x relaying portion, and the x spring connects the x relaying portion and the substrate. When this configuration is employed, a structure can be realized in which the x relaying portion is displaceably supported in the x-axis direction by the x spring at a height apart from the substrate, the outer movable portion is displaceably supported in the x-axis direction and the y-axis direction by the x spring and the y spring at a height apart from the substrate, and the inner movable portion is displaceably supported in the x-axis direction and the z-axis direction by the x spring and the z spring at a height apart from the substrate.

According to the structure described above, a relationship can be obtained in which the outer movable portion and the inner movable portion are reciprocatory oscillated in the x-axis direction by reciprocatory oscillating the x relaying portion in the x-axis direction, the inner movable portion is displaced in the z-axis direction by Coriolis force if angular velocity about the y-axis is applied, and the outer movable portion is displaced in the y-axis direction by Coriolis force if angular velocity about the z-axis is applied. A biaxial angular velocity sensor can be realized that is able to detect angular velocity about the y-axis and angular velocity about the z-axis. Alternatively, a triaxial acceleration sensor can be realized that detects accelerations in the x-axis direction, the y-axis direction and the z-axis direction from an amount of x-axis directional displacement of any of the x relaying portion, the outer movable portion and the inner movable portion, an amount of y-axis directional displacement of the outer movable portion, and an amount of z-axis directional displacement of the inner movable portion.

A biaxial angular velocity sensor can be realized by adding an oscillating portion that reciprocatory oscillates the x relaying portion in the x-axis direction, a y relaying portion, a y displacement detection unit that detects y-axis directional displacement of the y relaying portion, a z relaying portion, and a z displacement detection unit that detects z-axis directional displacement of the z relaying portion. The y displacement detection unit refers to a unit that detects an amount of y-axis directional displacement, while the z displacement detection unit is a unit that detects an amount of z-axis directional displacement. An x displacement detection unit to be subsequently described refers to a unit that detects an amount of x-axis directional displacement.

In this case, a structure is employed in which, the z relaying portion, together with being connected to the inner movable portion through a second x spring (namely, an x spring differing from the previously defined x spring that connects the x relaying portion and the substrate, and to apply similarly to expressions in the manner of a second y spring, a second z spring or a third x spring), is connected to the substrate through a second z spring, and is displaceably supported in the z-axis direction at a height apart from the substrate. The y relaying portion, together with being connected to the outer movable portion through a third x spring, is connected to the substrate through a second y spring, and a structure is employed in which it is displaceably supported in the y-axis direction at a height apart from the substrate.

According to the structure described above, a relationship is obtained in which the x relaying portion can be reciprocatory oscillated in the x-axis direction by an oscillating portion, and the outer movable portion and the inner movable portion are reciprocatory oscillated in the x-axis direction by following therewith. The inner movable portion is displaced in the z-axis direction by Coriolis force if angular velocity about the y-axis is applied. The inner movable portion is displaced in the z-axis direction while reciprocatory oscillating in the x-axis direction. Although the z relaying portion is displaced in the z-axis direction by following z-axis directional displacement of the inner movable portion, it is not displaced in the x-axis direction. Namely, the z relaying portion is only displaced in the z-axis direction due to Coriolis force in the z-axis direction. Since the z displacement detection unit detects an amount of z-axis directional displacement of the z relaying portion that is displaced only in the z-axis direction, it accurately detects angular velocity about the y-axis by accurately detecting Coriolis force in the z-axis direction. A similar occurrence is also obtained when angular velocity about the z-axis is applied. The outer movable portion is displaced in the y-axis direction by Coriolis force if angular velocity about the z-axis is applied. The outer movable portion is displaced in the y-axis direction while reciprocatory oscillating in the x-axis direction. Although the y relaying portion is displaced in the y-axis direction by following y-axis directional displacement of the outer movable portion, it is not displaced in the x-axis direction. Namely, the y relaying portion is only displaced in the y-axis direction due to Coriolis force in the y-axis direction. Since the y displacement detection unit detects an amount of y-axis directional displacement of the y relaying portion that is only displaced in the y-axis direction, angular velocity about the z-axis can accurately be detected by accurately detecting Coriolis force in the y-axis direction. Angular velocities about the y-axis and the z-axis can be detected by the structure described above.

A triaxial acceleration sensor can also be represented by using a common basic structure. In order to accomplish this, the x displacement detection unit that detects x-axis directional displacement of the x relaying portion, the y relaying portion, the y displacement detection unit that detects y-axis directional displacement of the y relaying portion, the z relaying portion and the z displacement detection unit that detect z-axis directional displacement of the z relaying portion are added. The z relaying portion, together with being connected to the inner movable portion through the second x spring, is connected to the substrate through the second z spring, and is displaceably supported in the z-axis direction at a height apart from the substrate. The y relaying portion, together with being connected to the outer movable portion through the third x spring, is connected to the substrate through the second y spring, and is displaceably supported in the y-axis direction at a height apart from the substrate. According to this structure, acceleration in the x-axis direction can be detected from an amount of x-axis directional displacement, acceleration in the y-axis direction can be detected from an amount of y-axis directional displacement, and acceleration in the z-axis direction can be detected from an amount of z-axis directional displacement.

The present specification also provides another different basic structure. This basic structure is provided with an outer movable portion provided with two sides extending in an x-axis direction and two sides extending in a y-axis direction, and an inner movable portion housed inside the outer movable portion when viewed from a z-axis direction. A y spring is interposed between the outer movable portion and a substrate, and the outer movable portion is displaceably supported in the y-axis direction by the y spring at a height apart from the substrate. A y-z spring connects the inner movable portion and the outer movable portion, a z spring is interposed between the inner movable portion and the substrate, and the inner movable portion is displaceably supported in the z-axis direction by the y-z spring and the z spring at a height apart from the substrate. Here, the y-z spring refer to an anisotropic spring for which the spring constant in the y-axis direction and the spring constant in the z-axis direction are smaller than the spring constant in the x-axis direction. Namely, this refers to a spring that is easy to deform in the y-axis direction and z-axis direction but difficult to deform in the x-axis direction.

The outer movable portion of the basic structure described above is displaceable in the y-axis direction. Although the inner movable portion can be displaced in the y-axis direction and the z-axis direction relative to the outer movable portion since it is connected with the y-z spring to the outer movable portion that can be displaced in the y-axis direction, it cannot be displaced in the y-axis direction and can only be displaced in the z-axis direction relative to the substrate since the z spring is interposed between the inner movable portion and the substrate. Namely, although the outer movable portion and the inner movable portion are relatively displaced in the y-axis direction, relative displacement in the y-axis direction is permitted since both are connected with the y-z spring.

According to the present basic structure as well, the above-mentioned objects can be realized, namely:

(1) realizing a structure provided with a first movable portion that is able to move in a direction perpendicular to a substrate surface (realized by the inner movable portion displaced in the z-axis direction) and a second movable portion that is able to move in a direction parallel to a substrate surface (realized by the outer movable portion displaced in the y-axis direction), (2) enabling the structure to be reduced in size and be mass-produced as a result of realizing with a laminated structure, and (3) increasing the number of structures that can be manufactured from a single substrate and decreasing manufacturing cost per structure by employing a nested structure for the first movable portion (the inner movable portion) and the second movable portion (the outer movable portion).

Since the structure described above is provided with the inner movable portion that is displaced in the z-axis direction and the outer movable portion that is displaced in the y-axis direction, a biaxial acceleration sensor can be realized immediately. In addition, various types of devices, such as a uniaxial angular velocity sensor, a biaxial angular velocity sensor, a triaxial acceleration sensor or an actuator that positions within the y-z-axis plane, can be realized from this basic structure.

For example, in the case of realizing a biaxial angular velocity sensor or a triaxial acceleration sensor, the basic structure may add a structure that allows displacement in the x-axis direction. In order to accomplish this, the basic structure may add an x relaying portion that is positioned outside the outer movable portion when viewed from the z-axis direction.

In the case of a structure in which the x relaying portion has been added, a configuration is employed in which the y spring connected to the outer movable portion is connected to the x relaying portion, and the x spring connects the x relaying portion and the substrate. In addition, a second x spring is added between the inner movable portion and the substrate. Namely, the second x spring and the z spring connect the inner movable portion and the substrate.

According to the configuration described above, a configuration can be realized in which the x relaying portion is displaceably supported in the x-axis direction at a height apart from the substrate, the outer movable portion is displaceably supported in the x-axis direction and the y-axis direction by the x spring and the y spring at a height apart from the substrate, and the inner movable portion is displaceably supported in the x-axis direction and the z-axis direction by the second x spring and the z spring at a height apart from the substrate. Since the outer movable portion and the inner movable portion are connected by the y-z spring, the outer movable portion and the inner movable portion are permitted to be relatively displaced in the y-axis direction and the z-axis direction. The outer movable portion and the inner movable portion are integrally displaced in the x-axis direction.

According to the structure described above, a relationship can be obtained in which the outer movable portion and the inner movable portion reciprocatory oscillate in the x-axis direction by reciprocatory oscillating the x relaying portion in the x-axis direction, the inner movable portion is displaced in the z-axis direction by Coriolis force if angular velocity about the y-axis is applied, and the outer movable portion is displaced in the y-axis direction by Coriolis force if angular velocity about the z-axis is applied. A biaxial angular velocity sensor that is able to detect angular velocity about the y-axis and angular velocity about the z-axis can be realized. Alternatively, a triaxial acceleration sensor can be realized that detects accelerations in the x-axis direction, the y-axis direction and the z-axis direction from an amount of x-axis directional displacement of any of the x relaying portion, the outer movable portion and the inner movable portion, an amount of y-axis directional displacement of the outer movable portion, and an amount of z-axis directional displacement of the inner movable portion.

A biaxial angular velocity sensor can be realized by adding an oscillating portion that reciprocatory oscillates the x relaying portion in the x-axis direction, a y relaying portion, a y displacement detection unit that detects y-axis directional displacement of the y relaying portion, a z relaying portion, and a z displacement detection unit that detects z-axis directional displacement of the z relaying portion. In this case, a structure is employed in which the z relaying portion is inserted between the z spring and the second x spring, and is displaceably supported in the z-axis direction at height apart from the substrate. The y relaying portion, together with being connected to the outer movable portion through the third x spring, is also connected to the substrate through the second y spring, and a structure is employed in which the y relaying portion is displaceably supported in the y-axis direction at a height apart from the substrate.

According to the structure described above, a relationship is obtained in which the x relaying portion can be reciprocatory oscillated in the x-axis direction by the oscillating portion, and the outer movable portion and the inner movable portion can be reciprocatory oscillated in the x-axis direction by following therewith. The inner movable portion is displaced in the z-axis direction by Coriolis force if angular velocity about the y-axis is applied. The inner movable portion is displaced in the z-axis direction while reciprocatory oscillating in the x-axis direction. Although the z relaying portion is displaced in the z-axis direction by following z-axis directional displacement of the inner movable portion, it is not displaced in the x-axis direction. Namely, the z relaying portion is only displaced in the z-axis direction due to Coriolis force in the z-axis direction. Since the z displacement detection unit detects an amount of z-axis directional displacement of the z relaying portion that is only displaced in the z-axis direction, Coriolis force in the z-axis direction is accurately detected, and angular velocity about the y-axis is accurately detected. A similar occurrence is also obtained when angular velocity about the z-axis is applied. The outer movable portion is displaced in the y-axis direction by Coriolis force if angular velocity about the z-axis is applied. The outer movable portion is displaced in the y-axis direction while reciprocatory oscillating in the x-axis direction. Although the y relaying portion is displaced in the y-axis direction by following y-axis directional displacement of the outer movable portion, it is not displaced in the x-axis direction. Namely, the y relaying portion is only displaced in the y-axis direction due to Coriolis force in the y-axis direction. Since the y displacement detection unit detects an amount of y-axis directional displacement of the y relaying portion that is only displaced in the y-axis direction, Coriolis force in the y-axis direction is accurately detected, and angular velocity about the z-axis is accurately detected. According to the structure described above, angular velocities can be detected about the y-axis and the z-axis.

A triaxial acceleration sensor can also be realized by using a common basic structure. In order to accomplish this, an x displacement detection unit that detects x-axis directional displacement of the x relaying portion, a y relaying portion, a y displacement detection unit that detects y-axis directional displacement of the y relaying portion, a z relaying portion, and a z displacement detection unit that detects z-axis directional displacement of the z relaying portion are added. The z relaying portion, together with being connected through the second x spring to the inner movable portion, is connected through the z spring to the substrate, and is displaceably supported in the z-axis direction at a height apart from the substrate. The y relaying portion, together with being connected through the third x spring to the outer movable portion, is connected through the second y spring to the substrate, and is displaceably supported in the y-axis direction at a height apart from the substrate.

According to this structure, acceleration in the x-axis direction can be detected from an amount of x-axis directional displacement, acceleration in the y-axis direction can be detected from an amount of y-axis directional displacement, and acceleration in the z-axis direction can be detected from an amount of z-axis directional displacement.

DETAILED DESCRIPTION OF INVENTION

Figure 1:
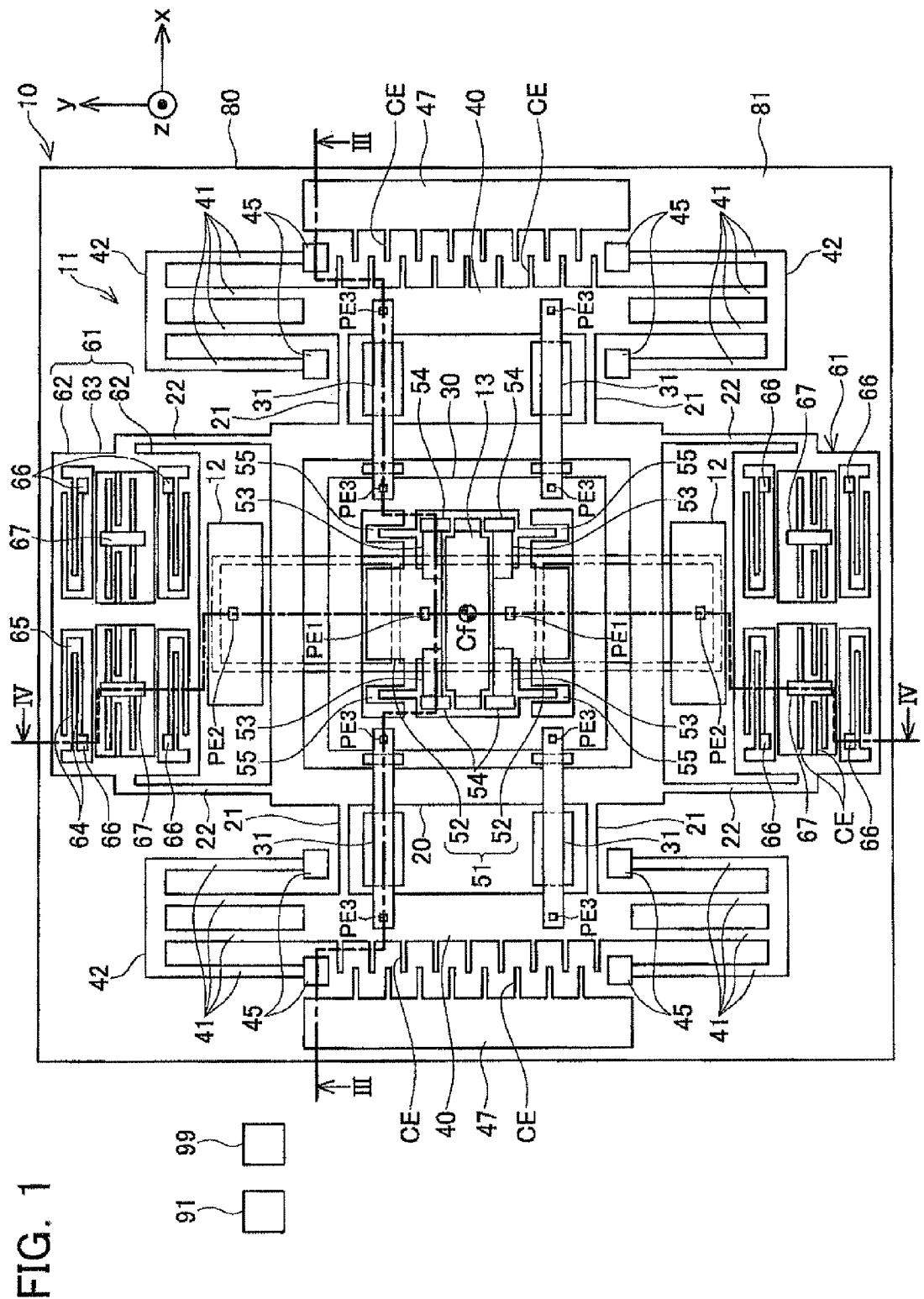
FIG. 1 shows an overhead view of a biaxial angular velocity sensor of Embodiment 1.

First, major features of embodiments explained later are as follows.

(Feature 1) An outer movable portion, a y spring, an internal movable portion and a z spring are formed in a trilayer (lower layer, middle layer, upper layer) structure.

(Feature 2) An outer movable portion is formed in a lower layer and a z spring is formed in an upper layer at a site where the z spring overpasses across the outer movable portion. There is no middle layer at the site where the z spring overpasses across the outer movable portion, and there is a gap equivalent to the thickness of the middle layer between the outer movable portion and the z spring.

(Feature 3) An outer movable portion, a y spring and an inner movable portion are formed in a lower layer, and a z spring is formed in an upper layer. The inner movable portion and the z spring are connected through a middle layer, there is no middle layer at a site where the z spring overpasses across the outer movable portion, and there is a gap equivalent to the thickness of the middle layer.

(Feature 4) An outer movable portion and a y spring are formed in a lower layer, and an inner movable portion and a z spring are formed in an upper layer. There is no middle layer at a site where the z spring overpasses across the outer movable portion, and there is a gap equivalent to the thickness of the middle layer.

(Feature 5) Outer stationary portions (portions fixed to a substrate) are formed at four locations farther to the outside than an outer movable portion and symmetrical with respect to an x-axis and a y-axis that pass through the center of the outer movable portion when viewed from a z-axis direction. An x spring, a y spring and a z spring are arranged at four locations symmetrical with respect to the x-axis and the y-axis. The outer movable portion and an inner movable portion are not allowed to rotate about the x-axis, y-axis and z-axis. In addition, a laminated structure provided with movable portions has high durability when vibrations and impacts are applied to a device, and it is possible to mount the laminated structure on a vehicle.

(Feature 6) Inner stationary portions (portions fixed to a substrate) are formed at four locations farther to the inside than an inner movable portion and symmetrical with respect to an x-axis and a y-axis that pass through the center of the inner movable portion when viewed from a z-axis direction. A second x spring and a second z spring are arranged at four locations symmetrical with respect to the x-axis and the y-axis. An outer movable portion and the inner movable portion are not allowed to rotate about the x-axis, y-axis and z-axis. In addition, a laminated structure provided with movable portions has high durability when vibrations and impacts are applied to a device, and it is possible to mount the laminated structure on a vehicle.

(Feature 7) A single z relaying portion is arranged between four second x springs and four second z springs in addition to Feature 6. The z relaying portion has a symmetrical shape with respect to the x-axis and the y-axis.

(Feature 8) An x relaying portion is arranged between a pair of x springs, and another x relaying portion is arranged between another pair of x springs in addition to Feature 7. The two x relaying portions are arranged at symmetrical locations with respect to the y-axis.

(Feature 9) A y relaying portion is supported on a substrate by a second y spring, and another y relaying portion is supported on a substrate by another second y spring in addition to Feature 8. The two y relaying portions are arranged at symmetrical locations with respect to the x-axis.

(Feature 10) Four third x springs are arranged at four symmetrical locations with respect to the x-axis and the y-axis in addition to Feature 9.

(Feature 11) Anisotropy is imparted to a spring according to a direction in which the spring extends and the cross-sectional shape of the spring. An x spring extends in a y-axis direction and the cross-sectional shape thereof is thin in an x-axis direction and thick in a z-axis direction. A y spring extends in the x-axis direction and the cross-sectional shape thereof is thin in the y-axis direction and thick in the z-axis direction. A z spring extends in the x-axial direction and the cross-sectional shape thereof is thin in the z-axis direction and thick in the y-axis direction. Alternatively, the z spring extends in the y-axis direction and the cross-sectional shape thereof is thin in the z-axis direction and thick in the x-axis direction.

(Feature 12) A laminated structure is formed by etching a prescribed range of each layer of a double SOI substrate.

(Feature 13) A laminated structure is formed by etching a prescribed range of each layer of an SOI substrate.

Embodiment 1

The following provides an explanation of Embodiment 1, in which a laminated structure according to the present invention is applied to a biaxial angular velocity sensor, with reference to FIGS. 1 to 4. A laminated structure 10 of the present embodiment is manufactured by etching a prescribed range of each layer of a double SOI substrate. The double SOI substrate used in the present embodiment has a five-layer structure, and is obtained by laminating in order starting from the top a silicon layer having a thickness of 5 μm (to be referred to as a first silicon layer), a silicon oxide layer having a thickness of 3 μm (to be referred to as a first oxide film), a silicon layer having a thickness of 15 μm (to be referred to as a second silicon layer), a silicon oxide layer having a thickness of 3 μm (to be referred to as a second oxide film), and a silicon layer having a thickness of 300 μm (to be referred to as a third silicon layer or substrate). The first silicon layer and the second silicon layer contain impurities and are conductors.

Figure 2:
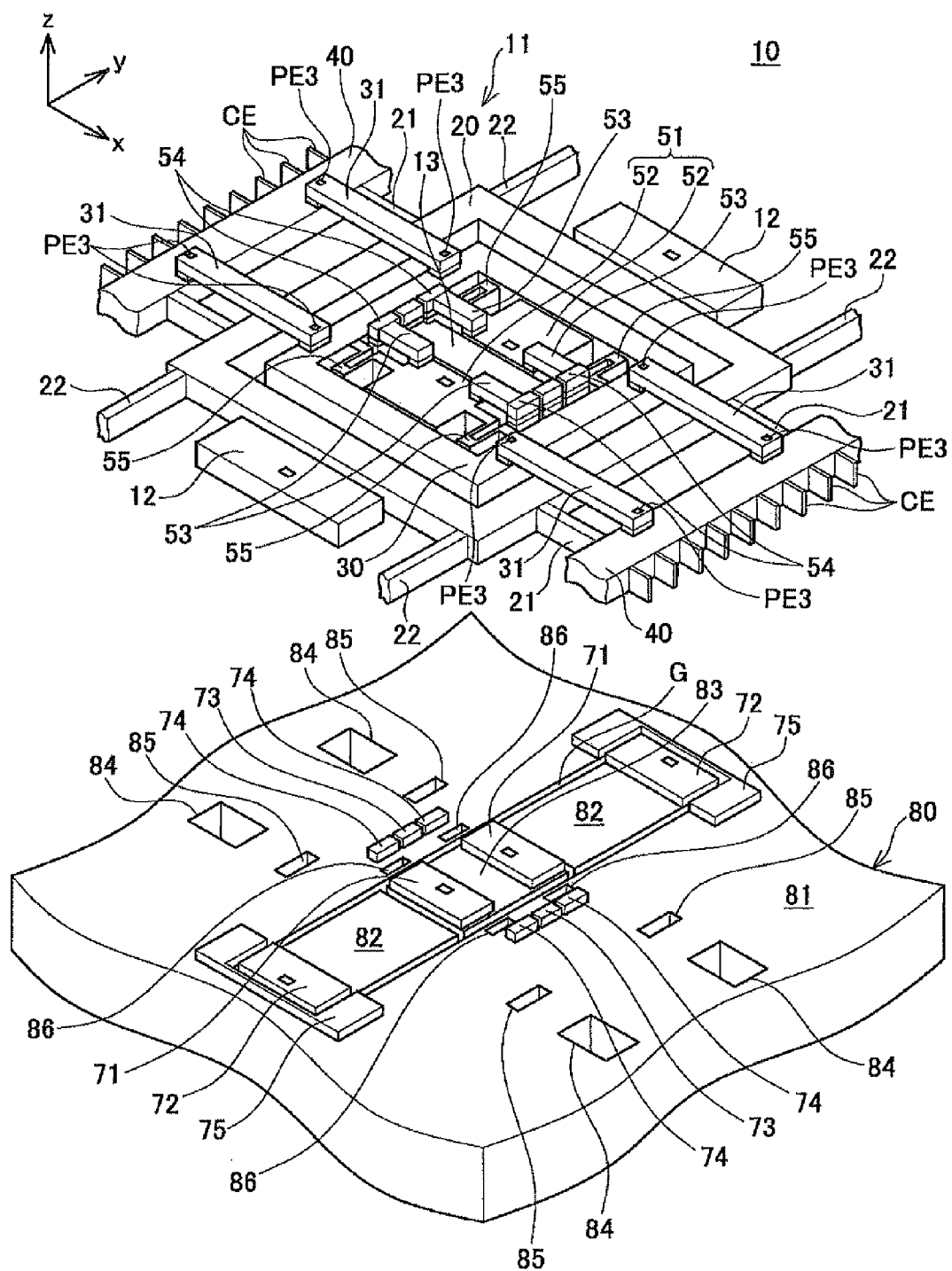
FIG. 2 shows a partially disassembled perspective view of a laminated structure of Embodiment 1.
Figure 3:
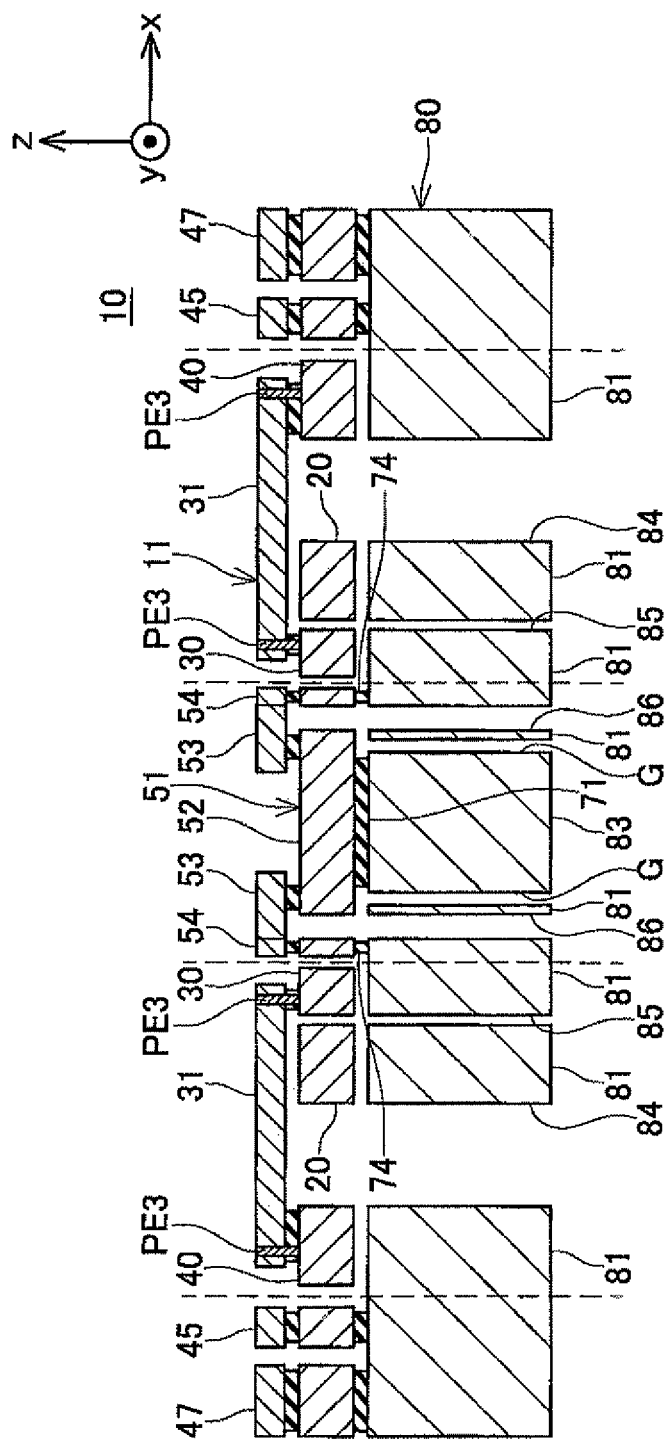
FIG. 3 shows an end view of a cross-sectional structure taken along line III-III of FIG. 1.
Figure 4:
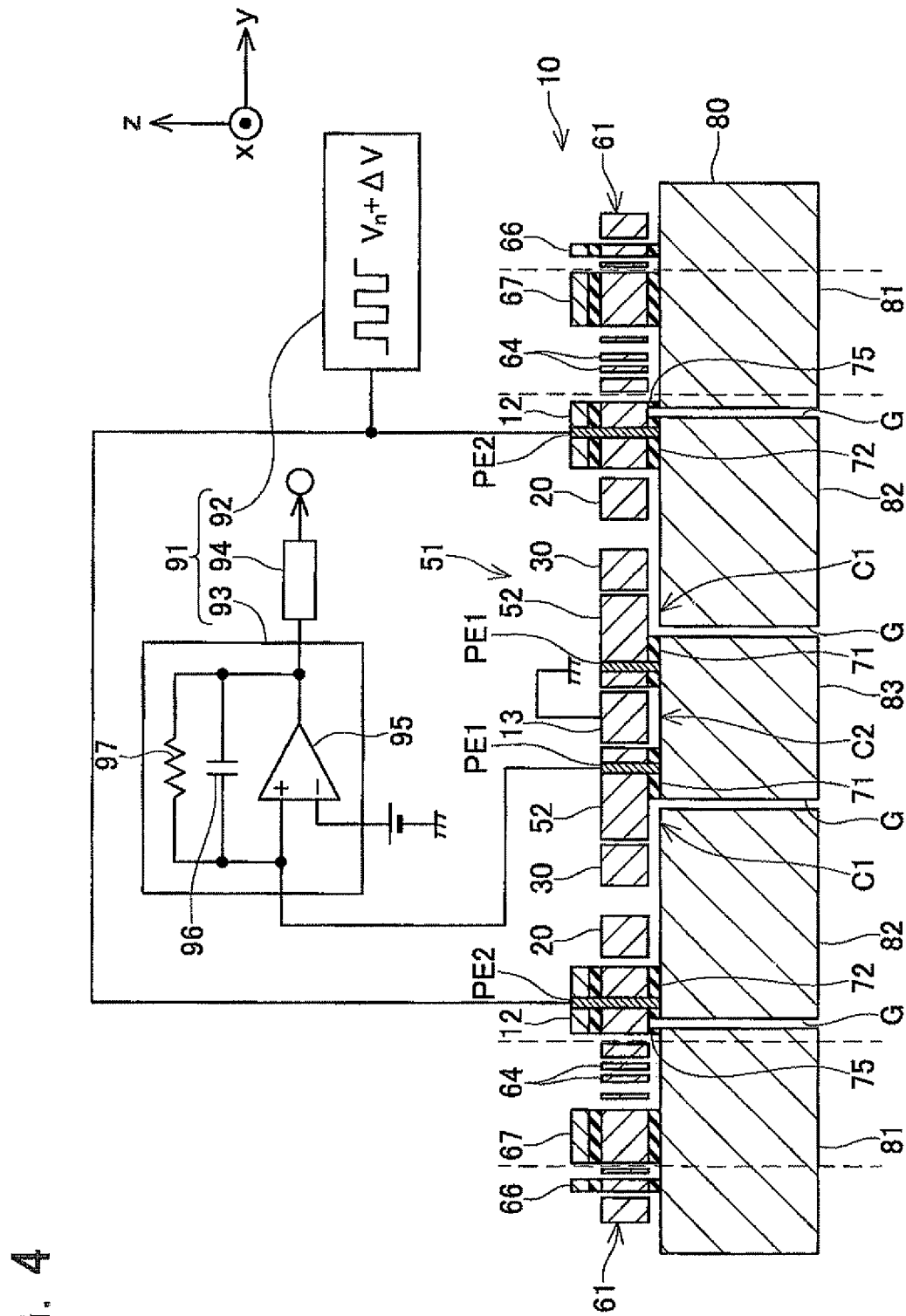
FIG. 4 shows a schematic drawing of a cross-sectional structure taken along line IV-IV of FIG. 1 and an electrical connection of a z displacement detection unit.

FIG. 1 shows an overhead view of a biaxial angular velocity sensor of Embodiment 1. As shown in FIG. 1, a biaxial angular velocity sensor is composed of the laminated structure 10, a z displacement output unit 91 and a y displacement output unit 99. FIG. 2 is a partially disassembled perspective view of the laminated structure 10. FIG. 3 shows a cross-sectional structure taken along line III-III of FIG. 1, and FIG. 4 shows a cross-sectional structure taken along line IV-IV of FIG. 1. Furthermore, FIG. 3 only shows a cross-sectional structure within a range indicated by the single-dot broken line of the line III-III of FIG. 1, while a depiction of a cross-sectional structure within a range indicated by the normal broken line is omitted. This applies similarly to FIG. 4 as well. In each drawing, the plane in which the surface of a substrate 80 extends is defined as an x-y plane, and a direction perpendicular to the substrate 80 is defined as a z-axis direction. As shown in FIG. 1, the laminated structure 10 is provided with an x spring stationary portion (outer stationary portion) 45 formed at 8 locations, a y spring stationary portion 66 formed at 8 locations, and a z spring stationary portion (inner stationary portion) 54 formed at 4 locations. A movable structure 11 is displaceably supported with respect to the substrate 80 by these stationary portions. In addition, the laminated structure 10 is provided with two first z direction stationary electrodes 12, one second z direction stationary electrode 13, four y direction stationary electrodes 67, two excitation electrodes 47, and the substrate 80 that supports them.

In the laminated structure 10 of the present embodiment, the substrate 80 is composed of the third silicon layer of the double SOI substrate. As shown in FIG. 2, the substrate 80 is separated into an outer substrate 81, two stationary electrode substrates 82, and an inner substrate 83 by a groove G that penetrates the substrate 80. All five layers of the double SOI substrate are present in the range of the x spring stationary portions 45, the y spring stationary portions 66, the z spring stationary portions 54, the y direction stationary electrodes 67, the first z direction stationary electrodes 12 and the excitation electrodes 47 shown in FIG. 1. The second oxide film is present at sites corresponding thereto. In addition, the second oxide film is present at a site corresponding to a z relaying portion 51 of the movable structure 11 to be subsequently described. However, the second oxide film is removed by etching at other sites. Furthermore, in other embodiments to be subsequently described as well, the second oxide film is removed by etching except for those sites for which the second oxide film is expressly explained as being present. In the laminated structure 10 of the present embodiment, a majority of the upper two layers (the first silicon layer and the first oxide film) of the double SOI substrate are removed by etching. More specifically, although the first silicon layer and the first oxide film are present at first z springs 31 and second z springs 53 of the movable structure 11 to be described later and the aforementioned sites in which all of the five layers are present (the x spring stationary portions 45, the y spring stationary portions 66, the z spring stationary portions 54, the y direction stationary electrodes 67, the first z direction stationary electrodes 12 and the excitation electrodes 47), they are removed at other sites.

A majority of the movable structure 11 is formed in the second silicon layer. As shown in FIG. 1, the movable structure 11 is fixed to the outer substrate 81 through the x spring stationary portions 45, the y spring stationary portions 66 and the z spring stationary portions 54. In the movable structure 11, the second oxide film is removed by etching except for a site corresponding to the z relaying portion 51 as previously described. Thus, a majority of the movable structure 11 is located at a height apart from the substrate 80 by the thickness of the second oxide film. The movable structure 11 is provided with an outer movable portion 20, an inner movable portion 30, two x relaying portions 40, two y relaying portions 61 and one z relaying portion 51, and these are composed of the second silicon layer.

As shown in FIG. 1, the outer movable portion 20 is in the shape of a roughly square frame provided with two sides extending in an x-axis direction and two sides extending in a y-axis direction. The inner movable portion 30 is housed within the frame of the outer movable portion 20. In the present embodiment, the inner movable portion 30 is also in the shape of a roughly square frame provided with two sides extending in the x-axis direction and two sides extending in the y-axis direction. The outer movable portion 20 and the inner movable portion 30 form a so-called nested structure. In the x-y plane of FIG. 1, centers Cf of the inner movable portion 30 and the outer movable portion 20 coincide. As shown in FIG. 1, in the laminated structure 10, all components are configured to be symmetrical with respect to the x-axis and y-axis that pass through the centers Cf of the outer movable portion 20 and the inner movable portion 30. In the drawings, the assignment of reference symbols is omitted for some members among pluralities of members that are symmetrical with respect to the x-axis and y-axis.

The two x relaying portions 40 extend in the y-axis direction, and are located outside the outer movable portion 20. The two x relaying portions 40 are arranged at symmetrical locations with respect to the y-axis that passes through the centers Cf. Four first x springs 41 are connected to end portions in the y-axis direction of the x relaying portions 40. The first x springs 41 are plate springs that extend in the y-axis direction, are thin in the x-axis direction and thick in the z-axis direction. In the first x springs 41, a spring constant in the x-axis direction is smaller than spring constants in the y-axis direction and the z-axis direction. Among the four first x springs 41, the two first x springs 41 located on the inside are directly connected to the x relaying portions 40, and the two first x springs 41 on the inside are connected to the two first x springs 41 located on the outside through x linking portions 42. The two first x springs 41 on the outside are connected to the x spring stationary portions 45. The first x springs 41 and the x linking portions 42 are formed in the second silicon layer. As has been previously described, all layers of the double SOI substrate are present in the x spring stationary portions 45 (FIG. 3), and are integrated with the outer substrate 81. As a result, the x relaying portions 40 are supported by the outer substrate 81 through the first x springs 41. The x relaying portions 40 are supported by the first x springs 41 at a height apart from the outer substrate 81 displaceably in the x-axis direction.

As shown in FIGS. 1 and 2, two first y springs 21 are connected to each side of the outer movable portion 20 extending in the y-axis direction. The first y springs 21 are formed in the second silicon layer. The first y springs 21 are plate springs that extend in the x-axis direction, are thin in the y-axis direction and thick in the z-axis direction. In the first y springs 21, the spring constant in the y-axis direction is smaller than the spring constants in the x-axis direction and z-axis direction. The first y springs 21 are connected to the x relaying portions 40. Thus, the outer movable portion 20 is supported by the x relaying portions 40 through the first y springs 21. The x relaying portions 40 connect the first y springs 21 and the first x springs 41. The x relaying portions 40 are supported on the outer substrate 81 by the first x springs 41. Thus, the outer movable portion 20 is supported by the outer substrate 81 through the first y springs 21 and the first x springs 41. The outer movable portion 20 is displaceable in the x-axis direction and the y-axis direction at a height apart from the outer substrate 81.

As shown in FIG. 1, two first z springs 31 are connected to each side of the inner movable portion 30 extending in the y-axis direction. As shown in FIGS. 2 and 3, the first z springs 31 are formed in the first silicon layer, and are connected to the x relaying portions 40 and the inner movable portion 30 through the first oxide film. Namely, the outer movable portion 20 and the first z springs 31 are formed in different layers at different distances from the substrate 80 (the first silicon layer and the second silicon layer), and the first z springs 31 overpass across the outer movable portion 20 at height apart from the outer movable portion 20 by the height of the first oxide film. The first z springs 31 are plate springs that extend in the x-axis direction, are thin in the z-axis direction and thick in the y-axis direction. In the first z springs 31, the spring constant in the z-axis direction is smaller than the spring constants in the x-axis direction and the y-axis direction.

The inner movable portion 30 is connected to the x relaying portions 40 through the first z springs 31. Namely, the inner movable portion 30 is supported by the x relaying portions 40 through the first z springs 31. The x relaying portions 40 connect the two first z springs 31 and the eight first x springs 41. The inner movable portion 30 is supported on the outer substrate 81 through the first z springs 31 and the first x springs 41. The inner movable portion 30 is displaceable in the x-axis direction and the z-axis direction at a height apart from the outer substrate 81.

As shown in FIG. 2, openings 84 and 85 are formed in the outer substrate 81. As shown in FIG. 3, the openings 84 and 85 are formed corresponding to the first z springs 31. Although a majority of the first silicon layer of the double SOI substrate is removed by etching, the first silicon layer is present over a range where the first z springs 31 are present. Thus, in etching prescribed ranges of the first oxide film, the second silicon layer and the second oxide film, it is difficult to etch the double SOI substrate from the side of the first silicon layer over a range where the first z springs 31 are present. Therefore, etching is carried out from the side of the outer substrate 81 (the third silicon layer) through the openings 84 and 85 over a range where the first z springs 31 are present.

As shown in FIG. 1, the two excitation electrodes 47 (oscillating portions) are located at the outside of the x relaying portions 40. As shown in FIG. 3, five layers of the double SOI substrate are present over the range where the two excitation electrodes 47 are present, and are integrated with the outer substrate 81. As shown in FIG. 1, in the x relaying portions 40, comb electrodes CE extending towards the outside are formed on the outside of the x relaying portions 40 (the side facing the excitation electrodes 47). In the excitation electrodes 47, comb electrodes CE extending towards the inside are formed on the inside thereof (the side facing the x relaying portions 40). The comb electrodes CE respectively formed on the x relaying portions 40 and the excitation electrodes 47 are formed alternately in the y-axis direction. When current is applied to each of the excitation electrodes 47, the comb electrodes CE of the x relaying portions 40 are attracted towards the excitation electrodes 47. The x relaying portions 40 are reciprocatory oscillated in the x-axis direction by alternately applying current to the two excitation electrodes 47.

Next, an explanation is provided about the z relaying portion 51, the first z direction stationary electrodes 12, the second z direction stationary electrode 13, the z displacement output unit 91 and peripheral components thereof. In the present embodiment, a z displacement detection unit is composed of the first z direction stationary electrodes 12 and the second z direction stationary electrode 13. As shown in FIGS. 2 and 3, the z relaying portion 51 is formed in the second silicon layer. The z relaying portion 51 is located at the inside of the inner movable portion 30 in FIG. 1, and is provided with two coupling portions 52. A center of the z relaying portion 51 (including the two coupling portions 52) and a center of the inner movable portion 30 coincide. As shown in FIG. 1, the two coupling portions 52 are mutually separated on the second silicon layer. However, as shown in FIGS. 2 and 4, the two coupling portions 52 are fixed to the inner substrate 83 through a second oxide film 71, and are integrated with the inner substrate 83. Thus, the two coupling portions 52 are integrated. The z relaying portion 51 composed of the two integrated coupling portions 52 is displaced integrally with the inner substrate 83.

As shown in FIG. 1, the two second z springs 53 are connected to each of the two coupling portions 52 at both ends in the x-axis direction. The second z springs 53 are connected to the z spring stationary portions 54. The four second z springs 53 and the four z spring stationary portions 54 are all located at the inside of the inner movable portion 30 in the overhead view of FIG. 1, and are arranged at four symmetrical locations relative to the x-axis and the y-axis that pass through the center Cf of the z relaying portion 51. The four z stationary portions 54 are fixed to the outer substrate 81. The second z springs 53 are plate springs that extend in the x-axis direction, are thin in the z-axis direction, and are thick in the y-axis direction. In the second z springs 53, the spring constant in the z-axis direction is smaller than the spring constants in the x-axis direction and the y-axis direction. As shown in FIGS. 2 and 3, the four second z springs 53 are formed in the first silicon layer, and one end of each of the second z springs 53 is connected to the coupling portion 52 through the first oxide film. Etching openings 86 are formed in the outer substrate 81 at sites corresponding to the second z springs 53. Furthermore, the openings 86 are omitted from FIG. 1, and the openings 86 are also omitted from overhead views of laminated structures in other subsequent embodiments. Five layers of the double SOI substrate are present in the four z spring stationary portions 54. Namely, in the z spring stationary portions 54, a second oxide film 74 is present on the outer substrate 81. Since the z relaying portion 51 is fixed to the outer substrate 81 through the second z springs 53, it is supported displaceably only in the z-axis direction at a height apart from the outer substrate 81.

Each of the two coupling portions 52 is linked to the inner movable portion 30 through two second x springs 55. The second x springs 55 are U-shaped bending springs having two sides extending in the y-axis direction, and the spring constant thereof in the x-axis direction is smaller than the spring constants thereof in the y-axis direction and the z-axis direction. The second x springs 55 are formed in the second silicon layer. As described above, the inner movable portion 30 can be displaced in the x-axis direction and the z-axis direction at height apart from the outer substrate 81 through the first z springs 31 and the first x springs 41. On the other hand, the z relaying portion 51 is only displaced in the z-axis direction without being displaced in the x-axis direction. Namely, the inner movable portion 30 and the z relaying portion 51 are required to be relatively displaced in the x-axis direction. Since the inner movable portion 30 and the z relaying portion 51 are connected by the second x springs 55, the inner movable portion 30 and the z relaying portion 51 are permitted to be relatively displaced in the x-axis direction by deformation of the second x springs 55 in the x-axis direction. The second x springs 55 do not deform in the z-axis direction. The z relaying portion 51 is displaced in the z-axis direction by following displacement of the inner movable portion 30 in the z-axis direction. The z relaying portion 51 exists between the four second x springs 55 and the four second z springs 53 and connects both of them.

In addition, since the second x springs 55 and the second z springs 53 are respectively arranged at four symmetrical locations relative to the x-axis and the y-axis that pass through the center Cf of the of the z relaying portion 51, the z relaying portion 51 and the inner movable portion 30 are not allowed to rotate about the x-axis and the y-axis. In addition, rotation about the z-axis is also restricted. Thus, since the laminated structure 10 has high durability for the application of vibrations or impacts, the laminated structure 10 can be installed in an automobile.

As shown in FIGS. 2 and 4, each of the two first z direction stationary electrodes 12 is fixed to the outer substrate 81 through a second oxide film 75, and are also connected to the stationary electrode substrates 82 through a second oxide film 72. The stationary electrode substrates 82 are mechanically fixed to the outer substrate 81 and electrically insulated from the outer substrate 81. As shown in FIG. 2, the second z direction stationary electrode 13 extends in the x-axis direction and overpasses the inner substrate 83, and is fixed to the outer substrate 81 through two second oxide films 73. The second z direction stationary electrode 13 is mechanically fixed to the outer substrate 81 and is electrically insulated from the outer substrate 81.

As shown in FIG. 4, the second z direction stationary electrode 13 is located above the inner substrate 83. In a state in which the inner substrate 83 is not displaced in the z-axis direction, a gap equal to the thickness of the second oxide film is formed between an upper surface of the inner substrate 83 and a lower surface of the second z direction stationary electrode 13. As was previously described, the inner substrate 83 is connected to the z relaying portion 51, and each of the coupling portions 52 of the z relaying portion 51 is respectively electrically connected to the inner substrate 83 through a penetrating electrode PE1. As shown in FIG. 1, each of the coupling portions 52 has electrical continuity with the inner movable portion 30 through the second x springs 55. Penetrating electrodes PE3 are formed on both ends of the first z springs 31 that connect the inner movable portion 30 and the x relaying portions 40. As a result, the inner substrate 83, the z relaying portion 51, the inner movable portion 30, the x relaying portions 40 and the outer movable portion 20 are all mutually electrically connected. In addition, the two first z direction stationary electrodes 12 are respectively electrically connected to the stationary electrode substrates 82 through penetrating electrodes PE2. In accordance with that described above, the laminated structure 10 is electrically insulated into three portions. Namely, the laminated structure 10 is electrically insulated into three portions consisting of: a portion composed of the inner substrate 83, the coupling portions 52, the inner movable portion 30, the x relaying portions 40 and the outer movable portion 20; a portion composed of the first z direction stationary electrodes 12 and the stationary electrode substrates 82; and a portion composed of the second z direction stationary electrode 13. In the present embodiment, the inner substrate 83 and the coupling portions 52 are integrated, and are displaced in the z-axis direction relative to the stationary electrode substrates 82 and the second z direction stationary electrode 13. Namely, if the inner substrate 83 approaches the second z direction stationary electrode 13, the coupling portions 52 move away from the stationary electrode substrates 82. Conversely, if the inner substrate 83 moves away from the second z direction stationary electrode 13, the coupling portions 52 approach the stationary electrode substrates 82.

As shown in FIG. 4, the z displacement output unit 91 is provided with a carrier signal generation unit 92, a C-V conversion unit 93 and an AM demodulation circuit 94. The carrier signal generation unit 92 applies a carrier voltage to the two stationary electrode substrates 82. The second z direction stationary electrode 13 is grounded. The electric potential of the inner electrode 83 and the coupling portions 52 are input to the C-V conversion unit 93. A capacitor C1 is formed between the stationary electrode substrates 82 and the coupling portions 52. A capacitor C2 is formed between the inner substrate 83 and the second z direction stationary electrode 13. The capacitor C1 and the capacitor C2 are connected in series. The two capacitors C1 and C2 connected in series generate a divided electric potential, and that divided electric potential appears in the coupling portions 52. This divided electric potential is amplified by the C-V conversion unit 93 composed of an operational amplifier 95, a capacitor 96 and a resistor 97, and is output as an analog electrical signal containing angular velocity information representing angular velocity by the AM demodulation circuit 94. Displacement of the z relaying portion 51 in the z-axis direction can be detected through the output of the z displacement output unit 91. If the z relaying portion 51 is displaced upward, the capacitance of the capacitor C2 increases and the capacitance of the capacitor C1 decreases. If the z relaying portion 51 is displaced downward, the capacitance of the capacitor C2 decreases and the capacitance of the capacitor C1 increases. Since changes in capacitance of the capacitors C1 and C2 occur in opposite directions, the divided electric potential changes greatly with respect to displacement in the z direction of the z relaying portion 51. Therefore, the z displacement output unit 91 has high detection sensitivity. In addition, since an amount of displacement in the z direction of the z relaying portion 51 is detected by utilizing the opposite direction of changes in capacitance of the capacitors C1 and C2, detection is insusceptible to the ambient temperature and the like. When the capacitance of the capacitors C1 and C2 changes in response to a change in ambient temperature, this has little effect on detection results since the changes in capacitance are in the same direction.

Next, an explanation is provided about the y relaying portions 61, the y direction stationary electrodes 67, the y displacement output unit 99 and peripheral components thereof. In the present embodiment, the y direction stationary electrodes 67 compose a y displacement detection unit. As shown in FIGS. 1 and 4, the two y relaying portions 61 are formed in the second silicon layer. As shown in FIG. 1, the two y relaying portions 61 are arranged at the outside of the outer movable portion 20, and are arranged at symmetrical locations relative to the x-axis that passes through the center Cf. Each y relaying portion 61 is provided with six frames. The six frames of the y relaying portions 61 are arranged in two columns in the x-axis direction and three rows in the y-axis direction, and among the three frames arranged in the y-axis direction, frames located on both ends in the y-axis direction are designated as outer frames 62, while a frame located in the center is designated as center frame 63. The y direction stationary electrodes 67 are arranged inside the center frame 63.

Each y relaying portion 61 is connected to the outer movable portion 20 through two third x springs 22. More specifically, in the overhead view of FIG. 1, one end of the third x springs 22 is connected to the side of the outer movable portion 20 that extends in the x-axis direction, while the other end of the third x springs 22 is connected to a site corresponding to the center frame 63 on the side of the y relaying portions 61 extending in the y-axis direction. The third x springs 22 are plate springs that are formed in the second silicon layer, extend in the y-axis direction, are thin in the x-axis direction and are thick in the z-axis direction. In the third x springs 22, the spring constant in the x-axis direction is smaller than the spring constants in the y-axis direction and the z-axis direction.

As shown in FIG. 1, each outer frame 62 of the y relaying portions 61 is connected to the y spring stationary portions 66 through second y springs 64 bent back in the shape of the letter U. More specifically, one side of the second y springs 64 is connected to the outer frames 62, and the one side of the second y springs 64 is connected to the other side of the second y springs 64 through y linking portions 65. A distal end of the other side of the second y springs 64 is connected to the y spring stationary portions 66. As shown in FIG. 4, the second y springs 64 are formed in the second silicon layer. As shown in FIG. 1, the second y springs 64 are plate springs that extend in the x-axis direction, are thin in the y-axis direction and are thick in the z-axis direction. In the second y springs 64, the spring constant in the y-axis direction is smaller than the spring constants in the x-axis direction and the z-axis direction. In addition, although not shown in the drawings, the y spring stationary portions 66 are also formed in the second silicon layer. As shown in FIG. 4, in the y spring stationary portions 66, all layers of the double SOI substrate are present, and are integrated with the outer substrate 81. As a result, the y relaying portions 61 are fixed to the outer substrate 81 through the second y springs 64, and the y relaying portions 61 are displaceably supported in the y-axis direction by the second y springs 64 at a height apart from the outer substrate 81. In addition, the y relaying portions 61 connect the second y springs 64 and the third x springs 22.

A single comb electrode CE is formed in the center frame 63 of the y relaying portions 61 extending in the x-axis direction from the left and right sides of the center frame 63 towards the inside of the frame. In addition, four comb electrodes CE are formed on each y direction stationary electrode 67. Two of the comb electrodes CE are formed on both sides of the y direction stationary electrodes 67 in the x-axis direction, and extend in the x-axis direction. The comb electrode CE of the center frame 63 is located between the two comb electrodes CE of the y direction stationary electrodes 67.

The y displacement output unit 99 changes an output value depending upon y-axis directional displacement of the y relaying portions 61. The output principle of the y displacement output unit 99 is the same as that of the z displacement output unit 91. Namely, when the y relaying portions 61 are displaced in the y-axis direction, the comb electrode CE of the center frame 63 of the y relaying portions 61 either approaches or moves away from the comb electrode CE of the y direction stationary electrode 67. As a result, electrostatic capacitance between the y relaying portions 61 and the y direction stationary electrode 67 changes. The y displacement output unit 99 changes an output value corresponding to this change in electrostatic capacitance. Displacement of the y relaying portions 61 can be detected based on an output of the y displacement output unit 99.

Next, an explanation is provided about an operation of the angular velocity sensor of the present embodiment with reference to FIGS. 1 and 4. As shown in FIG. 1, in the laminated structure 10, the x relaying portions 40 are reciprocatory oscillated in the x-axis direction by the excitation electrodes 47. The outer movable portion 20 is connected to the x relaying portions 40 through the first y springs 21, and the inner movable portion 30 is connected to the x relaying portions 40 through the first z springs 31. Thus, the outer movable portion 20 and the inner movable portion 30 reciprocatory oscillate in the x-axis direction. If angular velocity about the y-axis is applied while in this state, the inner movable portion 30 is displaced in the z-axis direction by Coriolis force. On the other hand, if angular velocity about the z-axis is applied, the outer movable portion 20 is displaced in the y-axis direction by Coriolis force.

When the inner movable portion 30 has been displaced in the z-axis direction by applying angular velocity about the y-axis, the z relaying portion 51 is displaced in the z-axis direction by following the z-axis directional displacement of the inner movable portion 30. However, it is not displaced in the x-axis direction, since the z relaying portion 51 is connected to the z spring stationary portions 54 through the second z springs 53. The z relaying portion 51 is only displaced in the z-axis direction by Coriolis force in the z-axis direction. As a result, since a change occurs in electrostatic capacitance as previously described, the z displacement output unit 91 outputs an amount of displacement of the z relaying portion 51 in the z-axis direction. Since the relaying portion 51 that is only displaced in the z-axis direction is used, Coriolis force in the z-axis direction can be output accurately, and angular velocity about the y-axis can be detected accurately.

In addition, when the outer movable portion 20 is displaced in the y-axis direction by applying angular velocity about the z-axis, the y relaying portions 61 are displaced in the y-axis direction by following the y-axis directional displacement of the outer movable portion 20. However, they are not displaced in the x-axis direction. The y relaying portions 61 are only displaced in the y-axis direction by Coriolis force in the y-axis direction. The y displacement output unit 99 detects an amount of y-axis directional displacement of the y relaying portions 61 that are only displaced in the y-axis direction. Since the y relaying portions 61 that are only displaced in the y-axis direction are used, Coriolis force in the y-axis direction can be output accurately and angular velocity about the z-axis can be detected accurately.

In addition, as a result of employing the configuration of the present embodiment as described above, it is possible to:

(1) realize on the outer substrate 81 a structure provided with the inner movable portion 30 that is displaced in the z-axis direction perpendicular to a substrate surface and the outer movable portion 20 that can move in the y-axis direction parallel to the substrate surface, (2) enable the laminated structure 10 of the double SOI substrate to be reduced in size and be mass-produced, and (3) increase the number of structures that can be manufactured from a single substrate and decrease manufacturing cost per structure by employing a nested structure for the outer movable portion 20 and the inner movable portion 30 since the inner movable portion 30 is housed within the outer movable portion 20 when viewed from the z-axis direction.

Embodiment 2

Figure 5:
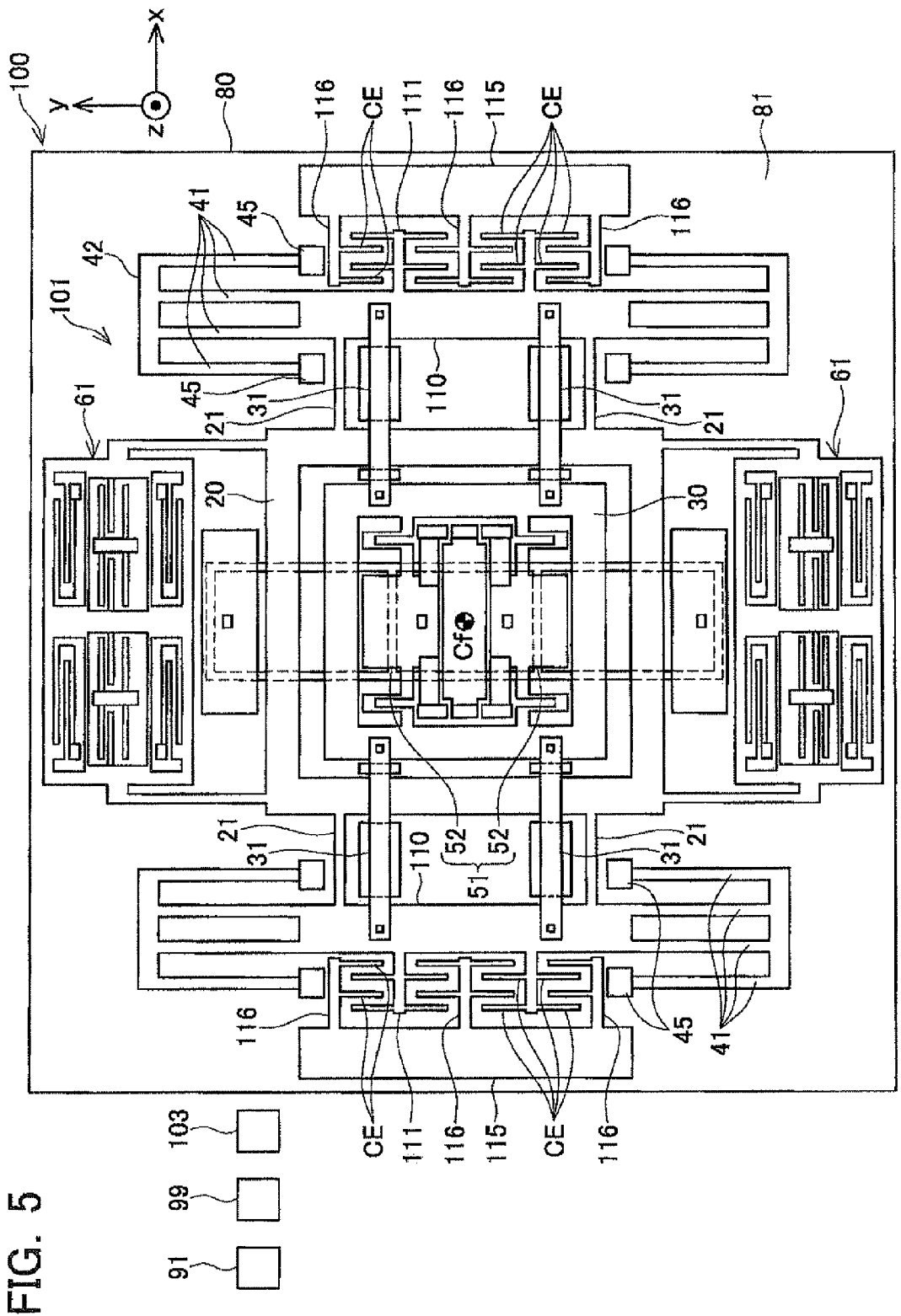
FIG. 5 shows an overhead view of a triaxial acceleration sensor of Embodiment 2.

The following provides an explanation of an Embodiment 2 in which the laminated structure according to the present invention is applied to a triaxial acceleration sensor with reference to FIG. 5. As shown in FIG. 5, a laminated structure 100 of the present embodiment is obtained by etching a prescribed range of each layer of a double SOI substrate in the same manner as the previously described Embodiment 1. The laminated structure 100 of the present embodiment is provided with a movable structure 101 that differs from Embodiment 1. In the movable structure 101 of the present embodiment, together with being provided with two x relaying portions 110 shown in FIG. 5 instead of the two x relaying portions 40 of Embodiment 1, two x direction stationary electrodes 115 are provided instead of the excitation electrodes 47 of Embodiment 1. The laminated structure 100 is electrically connected to an x displacement output unit 103, the y displacement output unit 99 and the z displacement output unit 91, and a triaxial acceleration sensor is composed of them. Since other constituents are the same as those of Embodiment 1, an explanation thereof is suitably omitted. In addition, the same reference numbers as Embodiment 1 are used in FIG. 5 to indicate those constituents that are the same as those in Embodiment 1.

The two x relaying portions 110 extend in the y-axis direction in the same manner as Embodiment 1. Each x relaying portion 110 is located at the outside of the outer movable portion 20, and is arranged at symmetrical locations relative to the y-axis that passes through the center Cf. The x relaying portions 110 are connected to the inner movable portion 30 through the first z springs 31. In addition, the x relaying portions 110 are connected to the outer movable portion 20 through the first y springs 21. The x relaying portions 110 are fixed to the x spring stationary portions 45 through the four first x springs 41.

In the present embodiment, two x direction stationary electrodes 115 compose an x displacement detection unit that detects x-axis directional displacement of each x relaying portion 110. The two x direction stationary electrodes 115 are located at the outside of each x relaying portion 110. Five layers of the double SOI substrate are present in the x direction stationary electrodes 115, and are integrated with the outer substrate 81. Two relay side supporting portions 111 extending towards the outside are formed at the outside of each relaying portion 110 (facing the x direction stationary electrodes 115). Four comb electrodes CE are extending in the y-axis direction from the sides of the relay side supporting portions 111. In each of the x direction stationary electrodes 115, three stationary side supporting portions 116 are formed at the inside thereof (facing the x relaying portions 110). Among the three stationary side supporting portions 116, two comb electrodes CE are formed on two of the stationary side supporting portions 116 on both ends, while four comb electrodes CE are formed on the single stationary side supporting portion 116 in the middle. The comb electrodes CE of the x relaying portions 110 and the comb electrodes CE of the x direction stationary electrodes 115 are alternately located in the x-axis direction and are mutually opposing.

The x displacement output unit 103 changes an output value depending upon x-axis directional displacement of the x relaying portions 110. The output principle of the x detection output unit 103 is the same as that of the z displacement output unit 91 and the y displacement output unit 99 of Embodiment 1. Namely, if an acceleration in the x-axis direction is applied to the laminated structure 100, for example, the outer moveable portion 20 and the inner movable portion 30 translationally move in the x-axis direction that is the opposite direction of the direction in which acceleration occurs. In addition, the x relaying portions 110 are also integrally displaced in the x-axis direction corresponding to the translational movement in the x-axis direction of the outer movable portion 20 and the inner movable portion 30. When the x relaying portions 110 are displaced in the x-axis direction, the eight comb electrodes CE of one of the x relaying portions 110 move away from the comb electrodes CE of the x direction stationary electrodes 115, while the eight comb electrodes CE of the other x relaying portions 110 approach. As a result, electrostatic capacitance changes between each of the x direction stationary electrodes 115 and their corresponding x relaying portions 110. The x displacement output unit 103 changes an output value depending upon this change in electrostatic capacitance. Acceleration in the x-axis direction can be detected based on an output value of the x displacement output unit 103.

In addition, when acceleration in the y-axis direction is applied to the laminated structure 100, the outer movable portion 20 and the inner movable portion 30 translationally move in the y-axis direction that is the opposite direction of the direction in which acceleration occurs. Therefore, the y relaying portions 61 are also displaced in the y-axis direction. The y displacement output unit 99 changes an output value corresponding to y-axis directional displacement of the y relaying portions 61. Acceleration in the y-axis direction can be detected based on an output value of the y displacement output unit 99. In addition, when acceleration in the z-axis direction is applied to the laminated structure 100, the outer movable portion 20 and the inner movable portion 30 translationally move in the z-axis direction that is the opposite direction from the direction in which acceleration occurs. Therefore, the z relaying portion 51 is also displaced in the z-axis direction. The z displacement output unit 91 changes an output value depending upon displacement of the z relaying portion 51 in the z-axis direction. Acceleration in the z-axis direction can be detected based on an output value of the z displacement output unit 91. Other actions and effects are the same as those of Embodiment 1.

Embodiment 3

Figure 6:
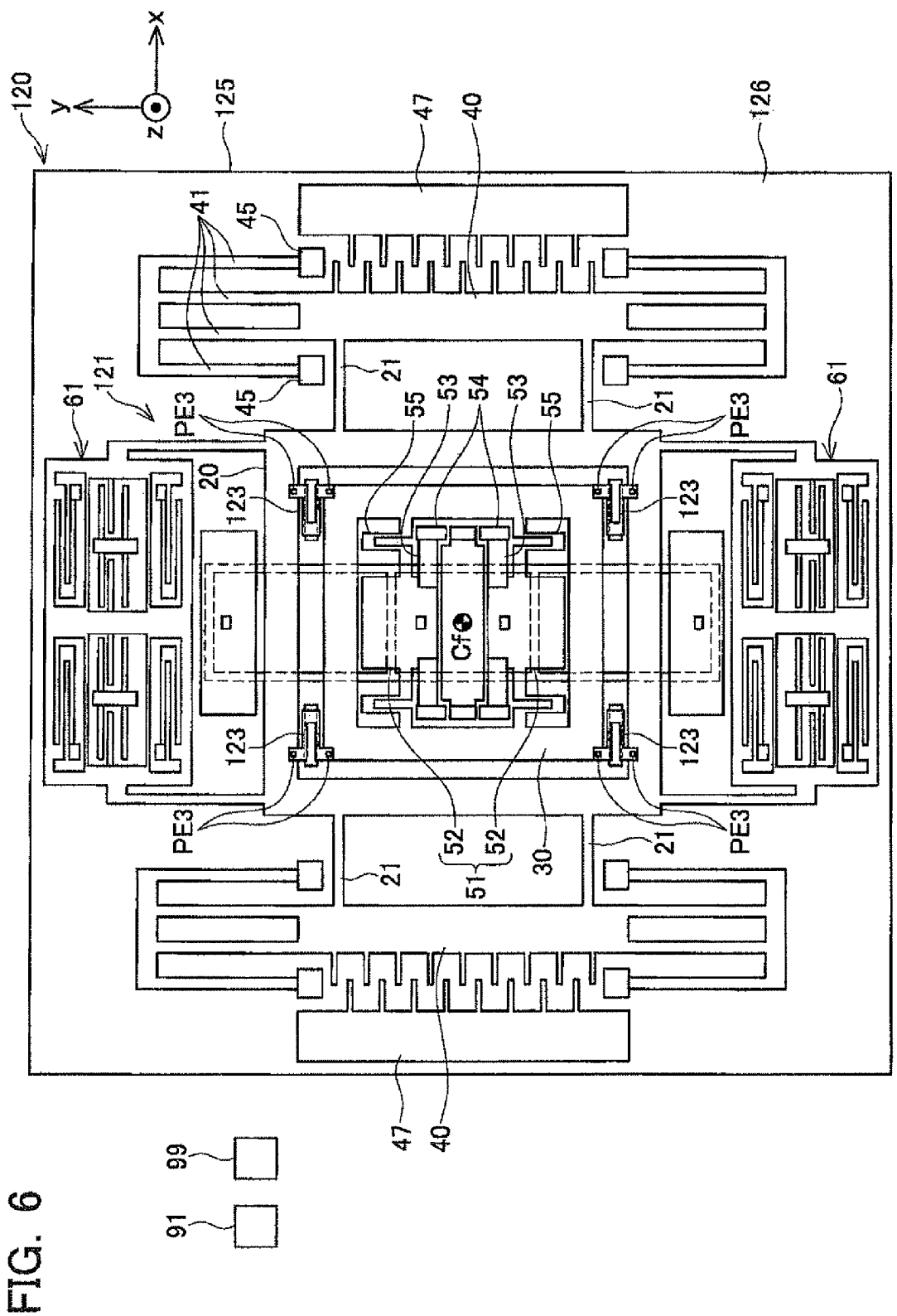
FIG. 6 shows an overhead view of a biaxial angular velocity sensor of Embodiment 3.
Figure 7:
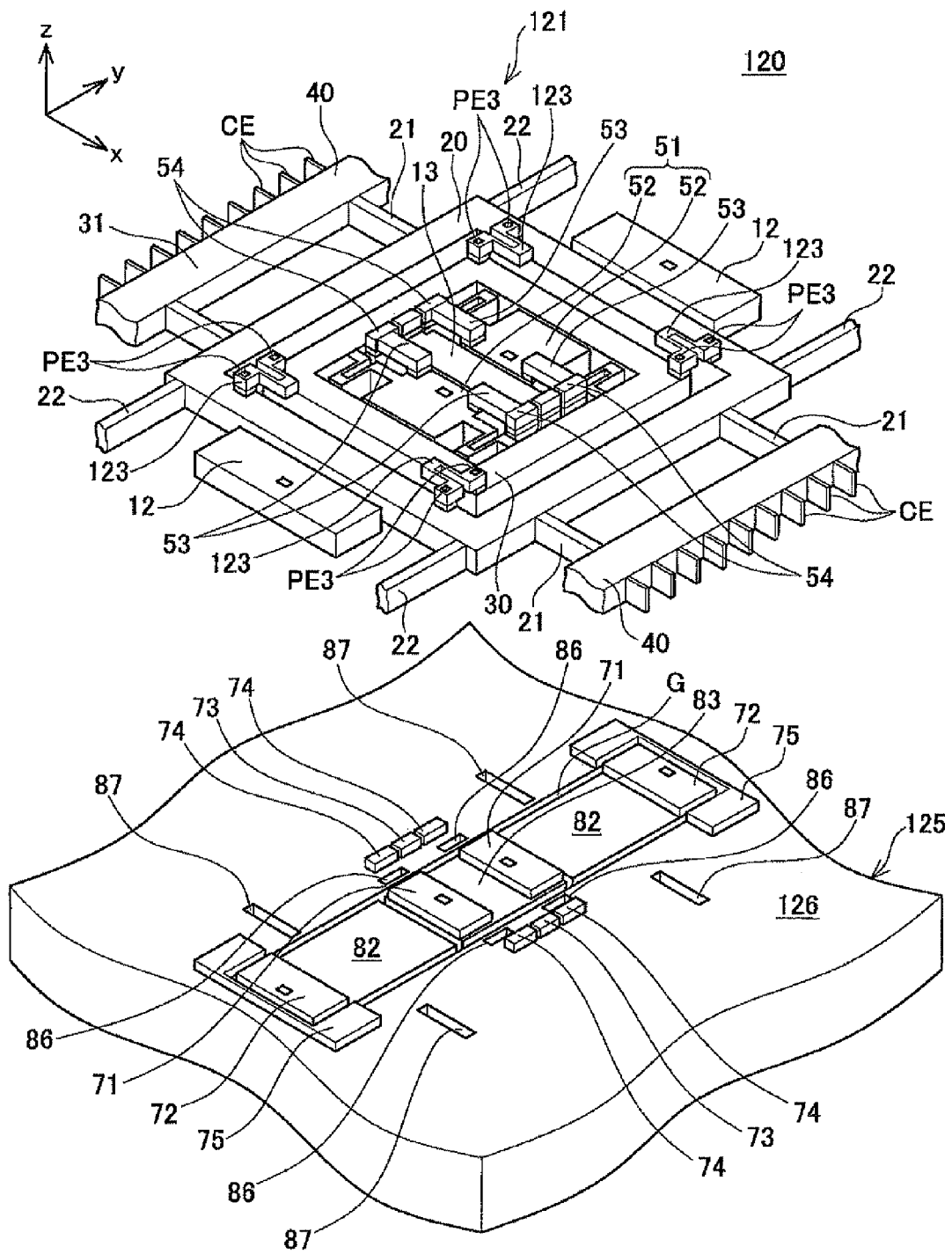
FIG. 7 shows a partially disassembled perspective view of a laminated structure of Embodiment 3.

The following provides an explanation of an Embodiment 3 in which the laminated structure according to the present invention is applied to a biaxial angular velocity sensor with reference to FIGS. 6 and 7. As shown in FIG. 6, a laminated structure 120 of the present embodiment is obtained by etching a specified range of each layer of a double SOI substrate in the same manner as each of the previously described embodiments. A biaxial angular velocity sensor is composed of this laminated structure 120, the y displacement output unit 99 and the z displacement output unit 91. The laminated structure 120 of the present embodiment is provided with a movable structure 121 that differs from Embodiment 1. The movable structure 121 is provided with four y-z springs 123 instead of the four first z springs 31 of Embodiment 1. As shown in FIG. 7, the openings 84 and 85 of Embodiment 1 are not formed in an outer substrate 126 of a substrate 125 since the first z springs 31 are not present in the present embodiment. However, openings 87 are formed corresponding to the four y-z springs 123. In addition, in the laminated structure 120 of the present embodiment as well, all constituents are symmetrical structures with respect to the x-axis and the y-axis that pass through the center Cf of the outer movable portion 20 and the inner movable portion 30. Since other constituents are the same as those of Embodiment 1, an explanation thereof is suitably omitted. In addition, the same reference numbers as Embodiment 1 are used in FIGS. 6 and 7 to indicate those constituents that are the same as those in Embodiment 1.

In the present embodiment, since the first z springs 31 of Embodiment 1 are not present as was previously described, the inner movable portion 30 and the x relaying portions 40 are not connected with the first z springs 31. As shown in FIG. 6, the inner movable portion 30 and the outer movable portion 20 are connected with the y-z springs 123. The y-z springs 123, together with being configured to extend in the x-axis direction and being bent back in the shape of a letter U, are thin both in the y-axis direction and z-axis direction. Namely, in the y-z springs 123, the spring constant in the y-axis direction and the spring constant in the z-axis direction are lower than the spring constant in the x-axis direction, making it easy to deform the y-z springs 123 in the y-axis direction and the z-axis direction, but difficult to deform in the x-axis direction. More specifically, both ends of each side of the inner movable portion 30 extending in the x-axis direction and both ends of each side of the outer movable portion 20 extending in the x-axis direction are connected with the y-z springs 123. In addition, as shown in FIG. 7, the y-z springs 123 are formed in the first silicon layer. Both ends of the y-z springs 123 are connected to the outer movable portion 20 and the inner movable portion 30 through the first oxide film. Penetrating electrodes PE3 are formed on both ends of the y-z springs 123, and electrical connection is maintained between the outer movable portion 20 and the inner movable portion 30.

As shown in FIG. 6, the z relaying portion 51 is fixed to the z spring stationary portions 54 through the second z springs 53. The z relaying portion 51 can only be displaced in the z-axis direction. The inner movable portion 30 is connected to the z relaying portion 51 through the second x springs 55. The inner movable portion 30 can be displaced in the x-axis direction and the z-axis direction through the second x springs 55 and the second z springs 53. In addition, the outer movable portion 20 can be displaced in the x-axis direction and the y-axis direction by the first x springs 41 and the first y springs 21 in the same manner as Embodiment 1. Since the inner movable portion 30 can be displaced in the x-axis direction and the z-axis direction, and the outer movable portion 20 can be displaced in the x-axis direction and the y-axis direction, the inner movable portion 30 and the outer movable portion 20 move relatively in the y-axis direction and the z-axis direction. Since the inner movable portion 30 is connected to the outer movable portion 20 through the y-z springs 123, the inner movable portion 30 and the inner movable portion 20 can relatively move in the y-axis direction and the z-axis direction. The y-z springs 123 do not deform in the x-axis direction. The inner movable portion 30 and the outer movable portion 20 are displaced by the same amount in the x-axis direction.

When the x relaying portions 40 are reciprocatory oscillated in the x-axis direction by the excitation electrodes 47, the outer movable portion 20 is also displaced in the x-axis direction, this is because the y springs 21 do not deform in the x-axis direction. In addition, since the inner movable portion 30 is connected to the outer movable portion 20 by the y-z springs 123, and the y-z springs 123 do not deform in the x-axis direction, the inner movable portion 30 is also displaced in the x-axis direction by following x-axis directional displacement of the x relaying portions 40. If angular velocity about the y-axis is applied under this state, the inner movable portion 30 is displaced in the z-axis direction by Coriolis force, and the z relaying portion 51 is only displaced in the z-axis direction in accompaniment thereof. Since the z displacement output unit 91 changes an output value depending upon displacement of the z relaying portion 51, angular velocity about the y-axis can be detected based on this output value. On the other hand, if angular velocity about the z-axis is applied under a condition in which the x relaying portions 40 are reciprocatory oscillating in the x-axis direction, the outer movable portion 20 is displaced in the y-axis direction by Coriolis force, and the y relaying portions 61 are only displaced in the y-axis direction in accompaniment thereof. Since the y displacement output unit 99 changes an output value depending upon displacement of the y relaying portions 61, angular velocity about the z-axis can be detected based on this output value.

In addition, in the present embodiment as well, it is possible to:

(1) realize on the outer substrate 126 a structure provided with the inner movable portion 30 that can be displaced in the z-axis direction perpendicular to a substrate surface and the outer movable portion 20 that is able to be displaced in the y-axis direction parallel to the substrate surface, (2) enable the laminated structure to be reduced in size and mass-produced by realizing with a laminated structure of a double SOI substrate, and (3) increase the number of structures that can be manufactured from a single substrate and decrease manufacturing cost per structure by composing a nested structure for the outer movable portion 20 and the inner movable portion 30 since the inner movable portion 30 is housed within the outer movable portion 20 when viewed from the z-axis direction. Other actions and effects are the same as Embodiment 1.

Embodiment 4

Figure 8:
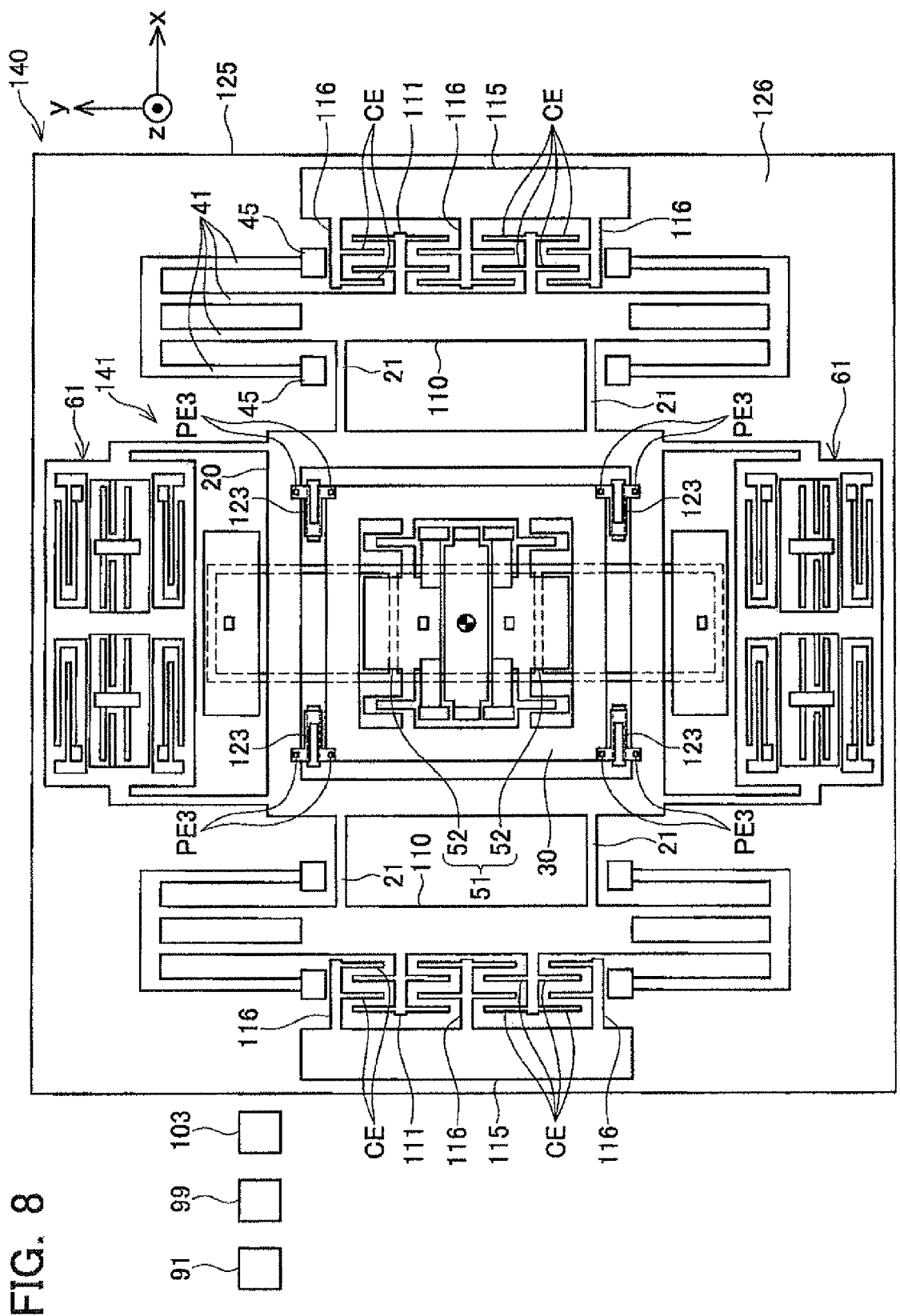
FIG. 8 shows an overhead view of a triaxial acceleration sensor of Embodiment 4.

The following provides an explanation of an Embodiment 4 in which the laminated structure according to the present invention is applied to a triaxial acceleration sensor with reference to FIG. 8. As shown in FIG. 8, a laminated structure 140 is obtained by etching a prescribed range of each layer of a double SOI substrate in the same manner as Embodiment 1. A triaxial acceleration sensor is composed of this laminated structure 140, the x displacement output unit 103, the y displacement output unit 99 and the z displacement output unit 91. The laminated structure 140 of the present embodiment is provided with a movable structure 141 that differs from each of the previously described embodiments. The movable portion 141 of the present embodiment is provided with the two x relaying portions 110 shown in FIG. 8 instead of the two x relaying portions 40 of Embodiment 3, and provided with the two x direction stationary electrodes 115 instead of the excitation electrodes 47 of Embodiment 3. Other constituents are the same as those of Embodiment 3. In addition, the configurations of the x relaying portions 110 and the x direction stationary electrodes 115 are the same as in Embodiment 2.

The laminated structure 140 is electrically connected with the x displacement output unit 103, the y displacement output unit 99 and the z displacement output unit 91. Since the configurations are the same as those of Embodiment 2 and Embodiment 3, an explanation thereof is omitted. The same reference numbers as Embodiment 2 and Embodiment 3 are used in FIG. 8 to indicate those constituents that are the same as those in Embodiment 2 and Embodiment 3.

When acceleration in the x-axis direction is applied to the laminated structure 140, the outer moveable portion 20 and the inner movable portion 30 translationally move in the x-axis direction that is the opposite direction of the direction in which acceleration occurs, and the x relaying portions 40 are displaced in the x-axis direction in accompaniment thereof. Since the x displacement output unit 103 changes an output value depending upon x-axis directional displacement of the x relaying portions 110, acceleration in the x-axis direction can be detected based on this output value. In addition, when acceleration in the y-axis direction is applied to the laminated structure 140, the y relaying portions 61 are displaced in the y-axis direction accompanying y-axis directional displacement of the outer movable portion 20. Since the y displacement output unit 99 changes an output value corresponding to y-axis directional displacement of the y relaying portions 61, acceleration in the y-axis direction can be detected. In addition, when acceleration in the z-axis direction is applied to the laminated structure 140, the z relaying portion 51 is displaced in the z-axis direction accompanying z-axis directional displacement of the inner movable portion 30. Since the z displacement output unit 91 changes an output value depending upon z-axis directional displacement of the z relaying portion 51, acceleration in the z-axis direction can be detected.

Embodiment 5

Figure 9:
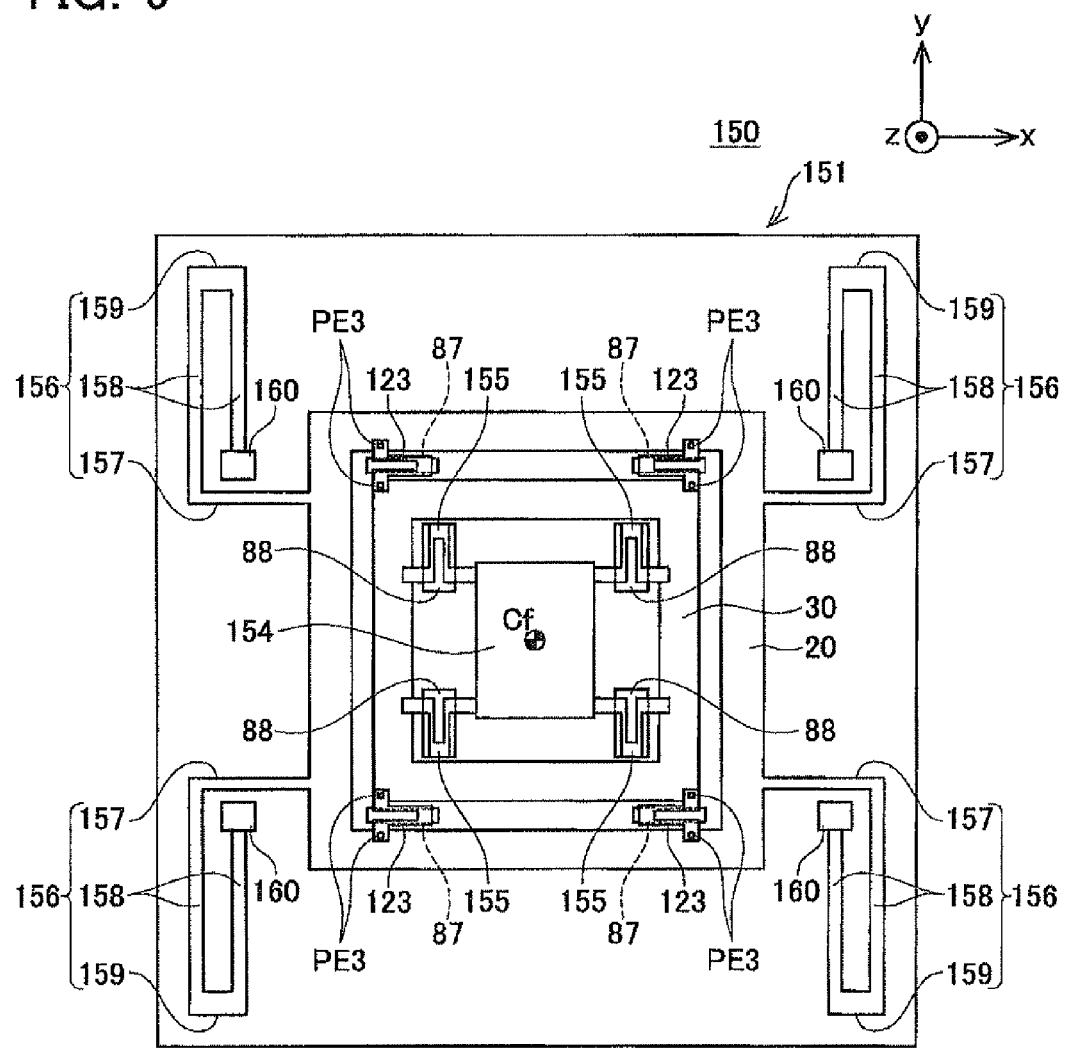
FIG. 9 shows an overhead view of a laminated structure of Embodiment 5.

The following provides an explanation of an Embodiment 5 of the laminated structure according to the present invention with reference to FIG. 9. A laminated structure 150 of the present embodiment is obtained by etching a prescribed range of each layer of a double SOI substrate in the same manner as the previously described Embodiment 1. As shown in FIG. 9, although the laminated structure 150 is the same as Embodiment 3 and Embodiment 4 in that the outer movable portion 20 and the inner movable portion 30 are connected with the y-z springs 123, other constituents thereof differ from those of Embodiment 3 and Embodiment 4. In addition, in the laminated structure 150 of the present embodiment as well, all constituents have a symmetrical configuration relative to the x-axis and the y-axis that pass through the center Cf of the outer movable portion 20 and the inner movable portion 30.

An x-z spring stationary portion 154 is housed within a frame of the inner movable portion 30. The x-z spring stationary portion 154 has a rectangular shape when viewed from overhead, and is present in all layers of the double SOI substrate. The center Cf of the outer movable portion 20 and the outer movable portion 30 coincides with the center of the x-z spring stationary portion 154. One end of two x-z springs 155 is connected to each side of the inner movable portion 30 extending in the y-axis direction, while the other end of the x-z springs 155 is connected to the x-z spring stationary portion 154. The x-z springs 155 are formed in the first silicon layer. The x-z springs 155 extend in the x-axis direction and are bent in the y-axis direction, and the thickness thereof in the z-axis direction is less than the thickness in the y-axis direction. Thus, the spring constants of the x-z springs 155 in the x-axis direction and the z-axis direction are smaller than the spring constant in the y-axis direction. The x-z springs 155 are easily deformed in the x-axis direction and the z-axis direction but deformed with difficulty in the y-axis direction. One end of the x-z springs 155 is connected to the inner movable portion 30 through the first oxide film (not shown in FIG. 9), while the other end of the x-z springs 155 is integrated with the first silicon layer of the x-z spring stationary portions 154. Openings 88 are formed in a substrate 151 for etching those sites corresponding to the x-z springs 155.

Two x-y springs 156 are connected to each side of the outer movable portion 20 extending in the y-axis direction, and the x-y springs 156 are fixed to x-y spring stationary portions 160. The x-y springs 156 are composed of the second silicon layer, and all layers of the double SOI substrate are present in the x-y spring stationary portions 160. The x-y springs 156 are composed of one y spring portion 157, two x spring portions 158 and an x linking portion 159. The y spring portion 157 is directly connected to the outer movable portion 20. The y spring portion 157 is a plate spring that extends in the x-axis direction, is thin in the y-axis direction and is thick in the z-axis direction, and the spring constant in the y-axis direction is smaller than the spring constants in the x-axis direction and the z-axis direction. The x spring portions 158 are plate springs that extend in the y-axis direction, are thin in the x-axis direction and are thick in the z-axis direction, and the spring constant in the x-axis direction is smaller than the spring constants in the y-axis direction and the z-axis direction. One of the x spring portions 158 is connected to the y spring portion 157, and the one of the x spring portion 158 is also connected to the x-y spring stationary portions 160 through the x linking portion 159 and the other x spring portion 158. As has been described above, in the x-y springs 156, the spring constants in the x-axis direction and the y-axis direction are smaller than the spring constant in the z-axis direction, making them easy to deform in the x-axis direction and the y-axis direction, but difficult to deform in the z-axis direction.

In the laminated structure 150 of the present embodiment, since the outer movable portion 20 is connected to the substrate 151 through the x-y springs 156, the outer movable portion 20 can be displaced in the x-axis direction and the y-axis direction. In addition, since the inner movable portion 30 is fixed to the substrate 151 through the x-z springs 155, it can be displaced in the x-axis direction and the z-axis direction. Since the outer movable portion 20 can be displaced in the y-axis direction and the x-axis direction, and the inner movable portion 30 can be displaced in the x-axis direction and the z-axis direction, the outer movable portion 20 is relatively displaced in the y-axis direction and the z-axis direction relative to the inner movable portion 30. The y-z springs 123 permit or absorb relative displacement of the two movable portions 20 and 30.

A biaxial angular velocity sensor can be realized or a triaxial acceleration sensor can be realized by combining the laminated structure 150 of the present embodiment with members provided by sensors of each of the previously described embodiments. In addition, in the present embodiment as well, it is possible to:

(1) realize on the outer substrate 151 a structure provided with the inner movable portion 30 that can be displaced in the z-axis direction perpendicular to a substrate surface and the outer movable portion 20 that is able to move in the y-axis direction parallel to the substrate surface, (2) enable the laminated structure to be reduced in size and mass-produced by realizing with a laminated structure of a double SOI substrate, and (3) increase the number of structures that can be manufactured from a single substrate and decrease manufacturing cost per structure by composing a nested structure for the outer movable portion 20 and the inner movable portion 30 since the inner movable portion 30 is housed within the outer movable portion 20 when viewed from the z-axis direction.

Embodiment 6

Figure 10:
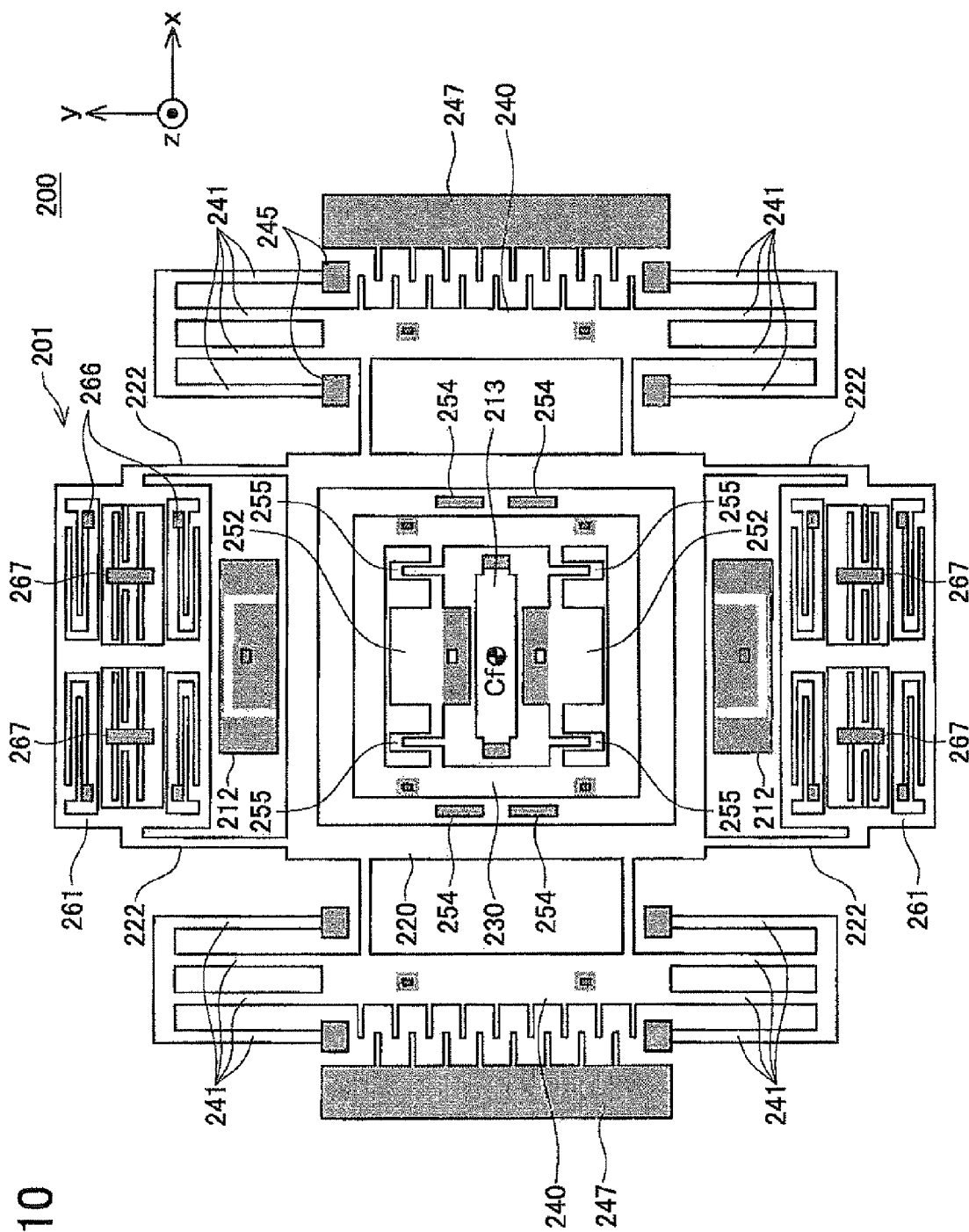
FIG. 10 shows an overhead view of a lower layer composing a biaxial angular velocity sensor of Embodiment 6.
Figure 11:
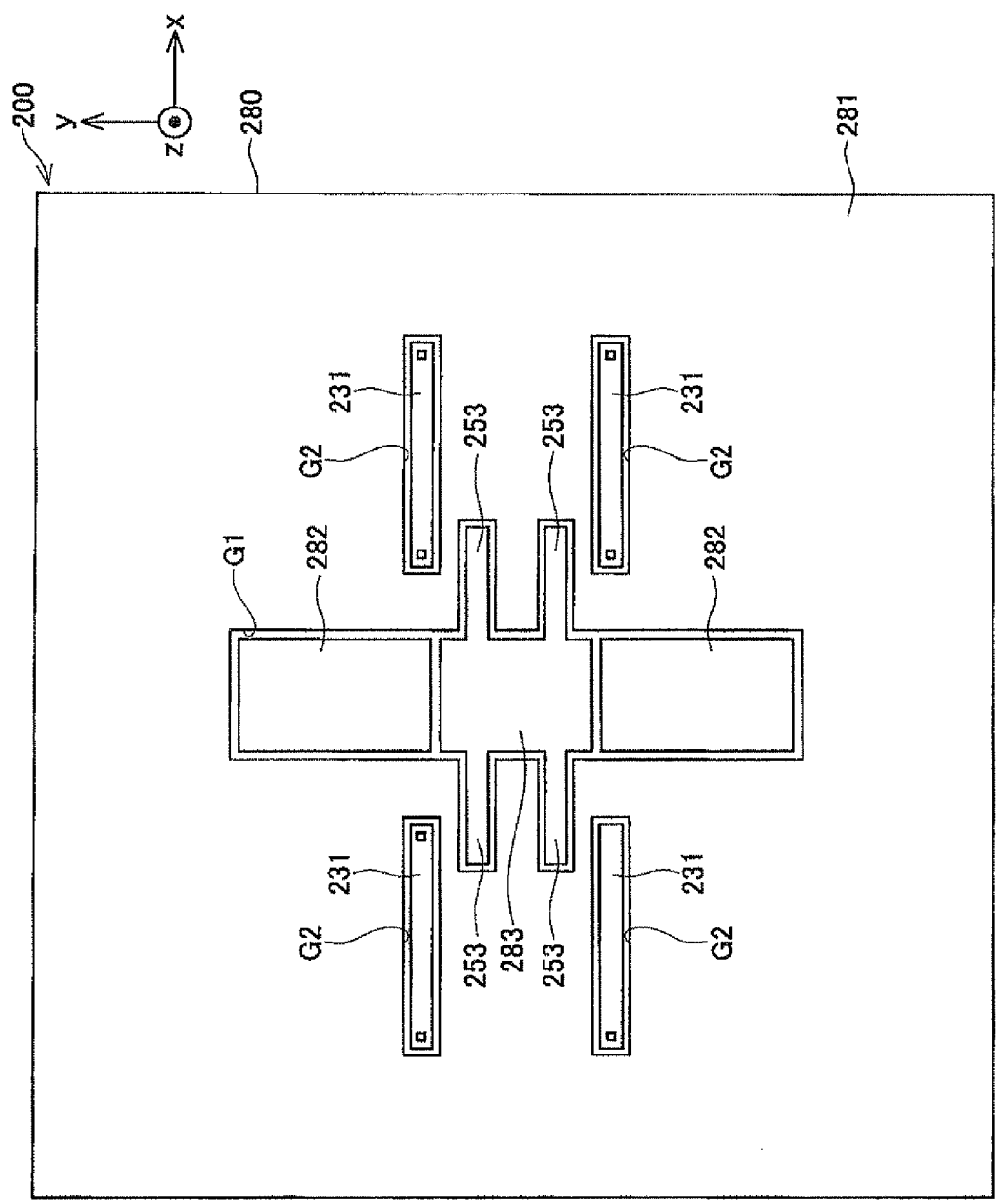
FIG. 11 shows an overhead view of an upper layer composing a biaxial angular velocity sensor of Embodiment 6; and, FIG. 12 shows an overhead view of a biaxial angular velocity sensor of Embodiment 6 in which an outer portion of an upper layer has been removed.
Figure 12:
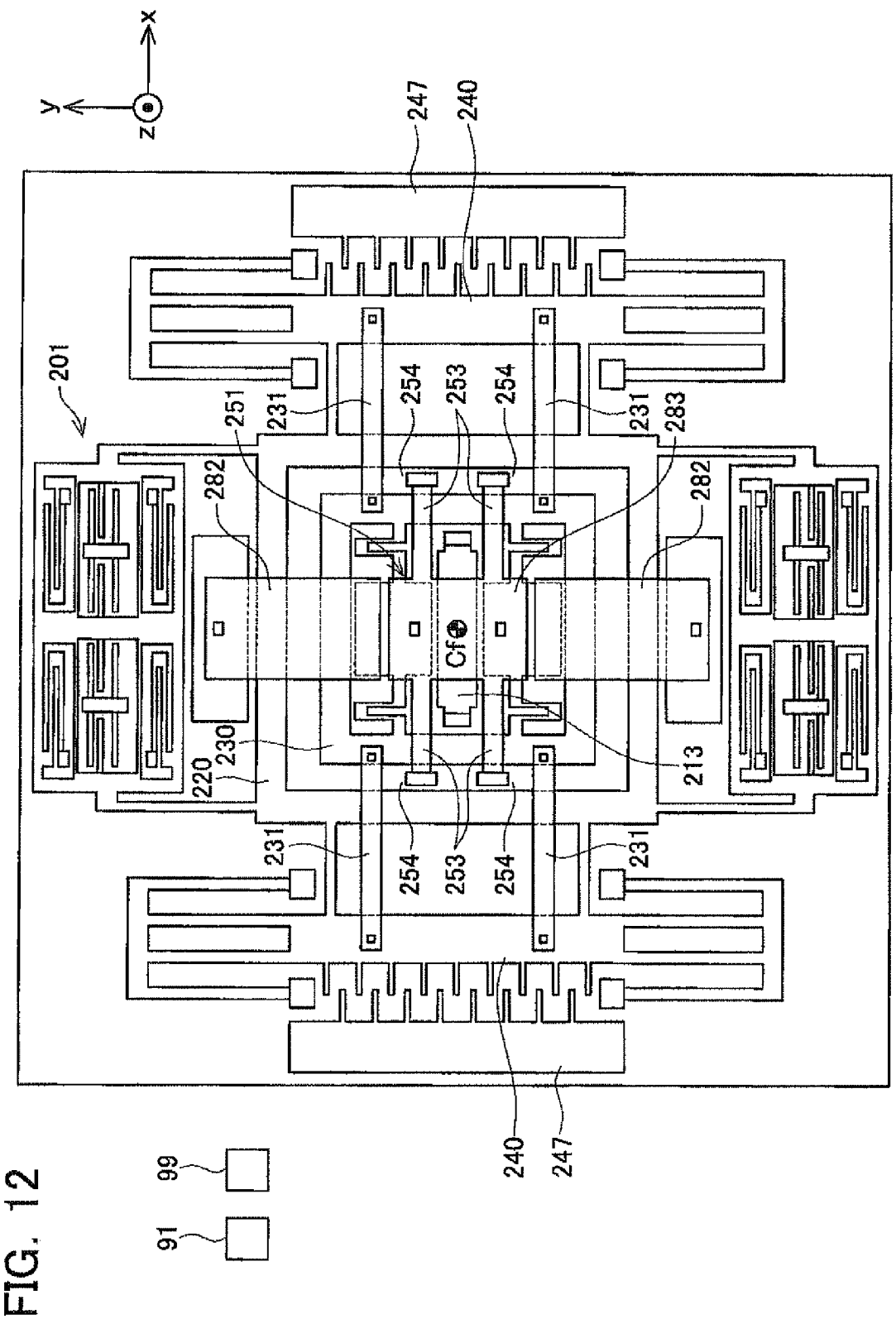

The following provides an explanation of an Embodiment 6 in which the laminated structure according to the present invention is applied to a biaxial angular velocity sensor with reference to FIGS. 10 to 12. A laminated structure 200 of the present embodiment differs from Embodiments 1 to 5 and it is manufactured by etching a prescribed range of a three-layered SOI substrate. In the three-layered SOI substrate used in the present embodiment, a silicon layer having a thickness of 5 μm (to be referred to as a first silicon layer), a silicon oxide layer having a thickness of 3 μm (to be referred to as a first oxide film), and a silicon layer having a thickness of 15 μm (to be referred to as a second silicon layer) are laminated in order starting from the top. Namely, the laminated structure 200 of the present embodiment differs from the laminated structures of Embodiments 1 to 5 in that a second oxide film and a third silicon layer are not present. Furthermore, although there is only one layer of the oxide film in the three-layered SOI substrate, this single oxide film is referred to as a first oxide film for the sake of convenience in order to maintain conformity with Embodiments 1 to 5.

Although the substrate was composed of a third silicon layer in Embodiments 1 to 5, in the present embodiment, a substrate 280 is composed of the first silicon layer. A majority of the movable structure 201 is composed of the second silicon layer arranged on the lower side of the first silicon layer. FIG. 10 indicates the range over which the second silicon layer remains, with the shaded portions indicating the range over which the second silicon layer is fixed to the first silicon layer through the first oxide film. Non-shaded portions indicate the range over which the first oxide film has been removed and the second silicon layer is dissociated from the first silicon layer. FIG. 10 indicates the state in which the first silicon layer has been removed. Reference numbers of those structures that are equivalent to those in FIG. 1 are indicated with reference numbers to which 200 has been added, and explanations thereof are omitted.

As shown in FIG. 11, grooves G1 and G2 are formed in the first silicon layer that composes the substrate 280. The substrate 280 is separated into an outer substrate 281, two stationary electrode substrates 282, an inner substrate 283, second z springs 253 and first z springs 231 by the grooves G1 and G2. FIG. 12 shows an overhead view obtained by removing the outer substrate 281. In actuality, the outer substrate 281 functions as a substrate that supports the movable structure 201.

The movable structure 201 has roughly the same structure as that of Embodiment 1. Those portions that are equivalent to Embodiment 1 are indicated with reference numbers to which 200 has been added, and explanations thereof are omitted. In the present embodiment, all three layers of the SOI substrate are present in x spring stationary portions 245, y spring stationary portions 266, z spring stationary portions 254, y direction stationary electrodes 267, outer portion of first z direction stationary electrodes 212, both ends of second z direction stationary electrode 213, and over the range of excitation electrodes 247, and are fixed to the outer substrate 281. All three layers are fixed to the inner substrate 283 within a range on the central side of a pair of coupling portions 252. A z relaying portion 251 is composed of the pair of coupling portions 252 and the inner substrate 283. An inner portion of the first z direction stationary electrodes 212 is fixed to the stationary electrode substrates 282. The capacitor C1 is formed between an upper surface of the coupling portions 252 and a lower surface of the stationary electrode substrates 282, and the capacitor C2 is formed between an upper surface of the second z direction stationary electrode 213 and a lower surface of the inner substrate 283. The coupling portions 252 and the inner substrate 283 are integrally displaced in the z-axis direction. If the coupling portions 252 and the inner substrate 283 are displaced upward, capacitance of the capacitor C1 increases while capacitance of the capacitor C2 decreases. If the coupling portions 252 and the inner substrate 283 are displaced downward, capacitance of the capacitor C1 decreases while capacitance of the capacitor C2 increases. The second z springs 253 are plate springs that extend in the x-axis direction, are thin in the z-axis direction, and are thick in the y-axis direction. The second z springs 253 extend from the inner substrate 283 in the x-axis direction, extend in the x-axis direction to a location between an inner movable portion 230 and an outer movable portion 220, and are fixed to the outer substrate 281 with the z spring stationary portions 254. The second z springs 253 overpass across the inner movable portion 230. A gap equal to the first oxide film is formed between the inner movable portion 230 and the second z springs 253. In the second z springs 253, the spring constant in the z-axis direction is smaller than the spring constants in the other axial directions. One end of the second z springs 253 is continuously connected with the inner substrate 283. In addition, the other end of the second z springs 253 is fixed to the inner substrate 281 through the z spring stationary portions 254. The first oxide film and the second silicon layer are present in the z spring stationary portions 254. The z spring stationary portions 254 extend in the y-axis direction at locations corresponding to the other end of the second z springs 253, overpass the second z springs 253 and the groove G1 on both sides thereof, and both sides thereof extend to the outer substrate 281. Together with both ends of the z spring stationary portions 254 being connected to the outer substrate 281, the second z springs 253 are connected in the center thereof. As a result, although the second z springs 253 are separated from the outer substrate 281 by the groove G1, they are fixed to the outer substrate 281 through the z spring stationary portions 254. In addition, the inner substrate 283 is connected to each of the coupling portions 252 of the z relaying portion 251 through the first oxide film. The z relaying portion 251 is fixed to the outer substrate 281 through the inner substrate 283, the second z springs 253 and the z spring stationary portions 254. The z relaying portion 251 is able to be displayed in the z-axis direction with respect to the outer substrate 281 through the second z springs 253. The inner substrate 283 is integrally displaced with the z relaying portion 251.

The second z direction stationary electrode 213 is located below the inner substrate 283. In a state in which the inner substrate 283 is not displaced in the z-axis direction, a gap equal to the thickness of the first oxide film is formed between a lower surface of the inner substrate 283 and an upper surface of the second z direction stationary electrode 213. In addition, although not shown in the drawings, the second z direction stationary electrode 213 is grounded in the same manner as each of the previously described embodiments, the z relaying portion 251, the inner movable portion 230 and the inner substrate 283 are electrically mutually connected, and the two first z direction stationary electrodes 212 are respectively electrically connected to the stationary electrode substrates 282. A capacitor is formed between the stationary electrode substrates 282 and each of the coupling portions 252, and a capacitor formed between the second z direction stationary electrode 213 and the inner substrate 283 is connected in series to this capacitor. When the z relaying portion 251 is displaced in the z-axis direction, a divided electric potential generated by the two capacitors connected in series changes, and the z displacement output unit 91 changes an output value depending upon z-axis directional displacement of the z relaying portion 251.

In the present embodiment, when x relaying portions 240 are oscillated in the x-axis direction by the excitation electrodes 247, the outer movable portion 220 and the inner movable portion 230 oscillate in the x-axis direction in accompaniment thereof. When angular velocity about the y-axis is applied, the inner movable portion 230 is displaced in the z-axis direction. Due to this, the z relaying portion 251 and the inner substrate 283 are also displaced in the z-axis direction by following therewith. As a result, the z displacement output unit 91 outputs an amount of z-axis directional displacement of the z relaying portion 251. Accordingly, Coriolis force in the z-axis direction can accurately be output, and angular velocity about the y-axis can accurately be detected. The outer movable portion 220 is displaced in the y-axis direction when angular velocity about the z-axis is applied. Therefore, the y relaying portions 261 are displaced in the y-axis direction by following therewith. As a result, the y displacement output unit 99 outputs an amount of y-axis directional displacement of the y relaying portions 261. Coriolis force in the y-axis direction can accurately be detected, and angular velocity about the z-axis can accurately be detected.

In the laminated structure 200 of the present embodiment as well, it is possible to:

(1) realize on the outer substrate 281 a structure provided with the inner movable portion 230 that can move in the z-axis direction perpendicular to a substrate surface and the outer movable portion 220 that is able to move in the y-axis direction parallel to the substrate surface, (2) enable the structure to be reduced in size and mass-produced by realizing with a laminated structure of an SOI substrate, and (3) increase the number of structures that can be manufactured from a single substrate and decrease manufacturing cost per structure by composing a nested structure for the outer movable portion 220 and the inner movable portion 230 since the inner movable portion 230 is housed within the outer movable portion 220 when viewed from the z-axis direction.

Furthermore, although the three-layered structure composed of an SOI substrate was applied to an angular velocity sensor in Embodiment 6, it may also be applied to a triaxial acceleration sensor composed of a three-layered structure by changing the excitation electrodes 247 of the laminated structure 200 to x direction stationary electrodes, and changing the x relaying portions 240 to the x relaying portions 110 as shown in Embodiments 2 and 4.

Other Embodiments

The second z springs 53 of Embodiments 1 and 2 may also be formed in the second silicon layer. The y-z springs 123 of Embodiments 3 and 4 may also be formed in the second silicon layer. The second silicon layer is 15 μm, and is thicker than the first silicon layer. Thus, in the case of forming the second z springs 53 and the y-z springs 123 in the second silicon layer, it is preferable to reduce the z-axis directional thickness of the second silicon layer 15 at sites corresponding to these springs.

In each of the previously described embodiments, in addition to the outer movable portion being able to be displaced not only in the y-axis direction but also in the x-axis direction, the inner movable portion can be displaced not only in the z-axis direction but also in the x-axis direction. However, a configuration may be employed in which the outer movable portion is only displaced in the y-axis direction but not displaced in the x-axis direction, or a configuration may be employed in which the inner movable portion is only displaced in the z-axis direction but not displaced in the x-axis direction. For example, in the movable structures of Embodiments 1 to 4 and 6, the x relaying portions are connected to the substrate through the first x springs. However, if the x relaying portions are directly connected to the x spring stationary portions, a configuration results in which the outer movable portion is only displaced in the y-axis direction and the inner movable portion is only displaced in the z-axis direction. In addition, the first y springs 21 and the first z springs 31 of Embodiments 1 and 2 may be connected directly to the stationary portions without connecting to the x relaying portions. This type of configuration allows the realization of a biaxial acceleration sensor or a uniaxial angular velocity sensor. In addition, although frames were employed for the shapes of both the outer movable portion and the inner movable portion in each of the embodiments previously described, the inner movable portion is not required to be in the shape of a frame, but rather the inner movable portion is only required to be inside the outer movable portion when the substrate of the laminated structure is viewed from overhead. In addition, the inner movable portion and the outer movable portion may be formed with different layers in an aspect in which, for example, the outer movable portion is formed with the second silicon layer and the inner movable portion is formed with the first silicon layer.

Although the above description has provided a detailed explanation of specific embodiments of the present invention, these are merely intended to be exemplary and are not intended to limit the scope of the claims for patent. Various variations and modifications of the specific embodiments listed above are included in the art described in the scope of claims for patent. Technical elements explained in the present specification or drawings demonstrates technical usefulness either alone or in various combinations thereof, and are not limited to combinations described in the claims at the time of filing. In addition, technology exemplified in the present specification or drawings is that which achieves multiple objects simultaneously, and the achievement of one of those objects per se has technical usefulness.

What is claimed is:

1. A laminated structure, when three mutually orthogonal axes are defined as an x-axis, a y-axis and a z-axis, a substrate surface is defined as an x-y plane, and an n-spring is defined as a member having a spring constant in a direction of an n-axis that is smaller than spring constants in other directions, where n is one of either x, y or z, comprising:
   an outer movable portion provided with two sides extending in an x-axis direction and two sides extending in a y-axis direction; and
   an inner movable portion housed inside the outer movable portion when viewed from a z-axis direction; wherein
   a y-spring is connected to the outer movable portion, and the outer movable portion is displaceably supported in the y-axis direction by the y-spring at a height apart from the substrate, a z-spring is connected to the inner movable portion, and the inner movable portion is displaceably supported in the z-axis direction by the z-spring at a height apart from the substrate, the outer movable portion and the z-spring are formed in different layers at different heights from the substrate, and the z-spring overpasses across the outer movable portion at a height apart from the outer movable portion.

2. The laminated structure according to claim 1, wherein an x relaying portion is added that is located outside the outer movable portion when viewed from the z-axis direction, the y-spring and the z-spring are connected to the x relaying portion, an x-spring connects the x relaying portion to the substrate, the x relaying portion is displaceably supported in the x-axis direction by the x-spring at a height apart from the substrate, the outer movable portion is displaceably supported in the x-axis direction and the y-axis direction by the x-spring and they y-spring at a height apart from the substrate, and the inner movable portion is displaceably supported in the x-axis direction and the z-axis direction by the x-spring and the z-spring at a height apart from the substrate.

3. The laminated structure according to claim 2, wherein an oscillating portion that reciprocatory oscillates the x relaying portion in the x-axis direction, a y relaying portion, a y displacement detection unit that detects y-axis directional displacement of the y relaying portion, a z relaying portion, and a z displacement detection unit that detects z-axis directional displacement of the z relaying portion are added, and wherein the z relaying portion, together with being connected to the inner movable portion through a second x-spring, is connected to the substrate through a second z-spring, and is displaceably supported in the z-axis direction at a height apart from the substrate, the y relaying portion, together with being connected to the outer movable portion through a third x-spring, is connected to the substrate through a second y-spring, and is displaceably supported in the y-axis direction at a height apart from the substrate, and angular velocities about the y-axis and about the z-axis are detectable.

4. The laminated structure according to claim 2, wherein an x displacement detection unit that detects x-axis directional displacement of the x relaying portion, a y relating portion, a y displacement detection unit that detects y-axis directional displacement of the y relaying portion, a z relaying portion, and a z displacement detection unit that detects z-axis directional displacement of the z relaying portion are added, wherein the z relaying portion, together with being connected to the inner movable portion through a second x-spring, is connected to the substrate through a second z-spring, and is displaceably supported in the z-axis direction at a height apart from the substrate, the y relating portion, together with being connected to the outer movable portion through a third x-spring, is connected to the substrate through a second y-spring, and is displaceably supported in the y-axis direction at a height apart from the substrate, and accelerations in the x-axis direction, the y-axis direction and the z-axis direction are detectable.

\* \* \* \* \*